US007263219B2

(12) United States Patent
Ikenoue

(10) Patent No.: US 7,263,219 B2
(45) Date of Patent: Aug. 28, 2007

(54) IMAGE PROCESSOR

(75) Inventor: Yoshikazu Ikenoue, Toyohashi (JP)

(73) Assignee: Minolta Co., Ltd., Osaka (JP)

( * ) Notice: Subject to any disclaimer, the term of this patent is extended or adjusted under 35 U.S.C. 154(b) by 41 days.

(21) Appl. No.: 10/721,730

(22) Filed: Nov. 25, 2003

(65) Prior Publication Data

US 2004/0228541 A1    Nov. 18, 2004

Related U.S. Application Data

(60) Division of application No. 09/639,360, filed on Aug. 14, 2000, now Pat. No. 6,771,812, which is a division of application No. 08/987,267, filed on Dec. 9, 1997, now Pat. No. 6,185,326, which is a division of application No. 08/429,469, filed on Apr. 27, 1995, now Pat. No. 5,956,420, which is a continuation of application No. 07/995,204, filed on Dec. 22, 1992, now abandoned.

(30) Foreign Application Priority Data

| Dec. 27, 1991 | (JP) | ................. 3-346249 |
|---|---|---|
| Dec. 27, 1991 | (JP) | ................. 3-346261 |
| Dec. 27, 1991 | (JP) | ................. 3-347372 |
| Dec. 27, 1991 | (JP) | ................. 3-347390 |

(51) Int. Cl.
*G06K 9/34* (2006.01)

(52) U.S. Cl. ............. 382/164; 382/175; 382/199; 382/266

(58) Field of Classification Search ........... 382/164, 382/165, 175, 176, 199, 200, 201, 266, 100, 382/232; 358/1.9, 1.11; 713/176; 399/366; 705/57, 58; 386/94

See application file for complete search history.

(56) References Cited

U.S. PATENT DOCUMENTS

| 3,652,992 A | 3/1972 | Koll ..................... 340/146.3 |
|---|---|---|
| 4,566,124 A | 1/1986 | Yamamoto et al. ........... 382/21 |
| 4,627,002 A | 12/1986 | Blum et al. ................ 358/1.9 |

(Continued)

FOREIGN PATENT DOCUMENTS

JP    2-111161 A    4/1990

OTHER PUBLICATIONS

Gazou Denshi Gakkaishi publication 17, 3 (1988).

(Continued)

*Primary Examiner*—Vikkram Bali
(74) *Attorney, Agent, or Firm*—Sidley Austin LLP

(57) ABSTRACT

Additive information for restoring the contour of an image is generated and embedded in the image data. The format of the additive information is determined beforehand. When a hard copy is produced, the additive information is extracted from received image data. The additive information is for example vary small characteristic points of a density different from the density assigned for image data and arranged inside the contour. The image data is restored according to the extracted additive information. The additive information can be generated for example from the code information for generating patterns such as control points data of an outline font. For a half-tone image, a plurality of density bands is assigned to the additive information. A read error is detected by comparing the restored image with the received image data.

6 Claims, 38 Drawing Sheets

U.S. PATENT DOCUMENTS

| | | | |
|---|---|---|---|
| 4,725,966 A | 2/1988 | Darby et al. | 358/1.9 |
| 4,829,568 A | 5/1989 | Clark et al. | 380/23 |
| 4,847,641 A | 7/1989 | Tung et al. | 346/154 |
| 5,033,105 A | 7/1991 | Atkinson | 382/56 |
| 5,086,478 A | 2/1992 | Kelly-Mahaffey | 382/8 |
| 5,091,976 A | 2/1992 | Murayama | 382/56 |
| 5,179,638 A * | 1/1993 | Dawson et al. | 345/582 |
| 5,237,624 A | 8/1993 | Okamoto et al. | 382/22 |

OTHER PUBLICATIONS

N. Komatsu et al, "A Proposal on Digital Watermark in Document Image Communication and its Application to Realizing a Signature", Electronics & Communication in Japan, Part 1, vol. 73, No. 5, 1990, pp. 22-33.

N. Komatsu et al, :"Authentication System Using Concealed Image in Telematics", Department of Electronics and Communication Engineering, Waseda University, 1988, pp. 45-60.

W. Szepanski, "A Signal Theoretic Method for Creating Forgery Proof Documents for Automatic Verification", Garnahan Conference on Crime Countermeasures, University of Kentucky, May 16-18, 1979, pp. 101-109.

* cited by examiner

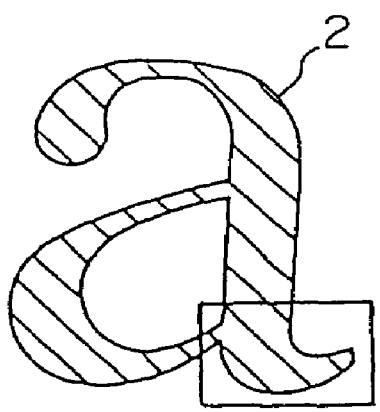
Fig. 1(a)
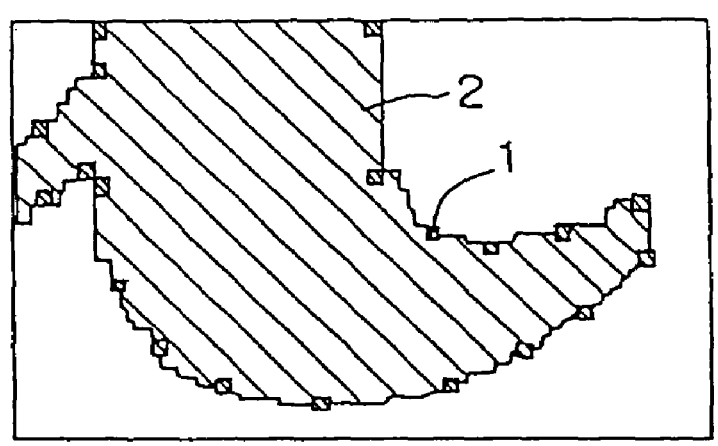
Fig. 1(b)
Fig. 2(a)
Fig. 2(b)
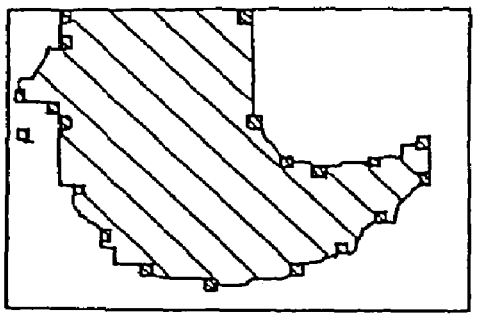
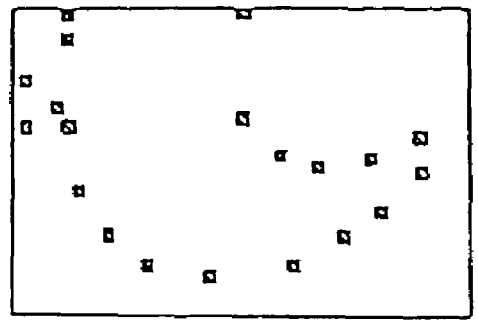
Fig. 2(d)
Fig. 2(c)
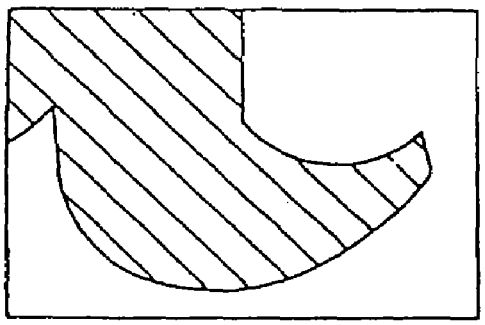
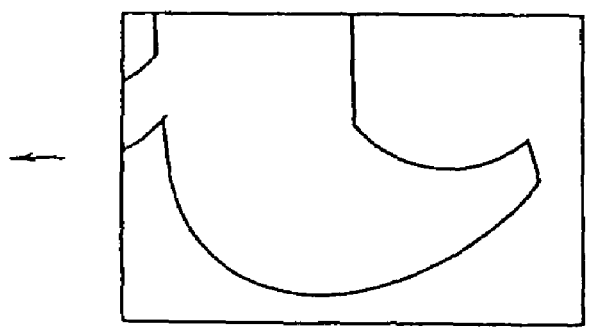

[<] candidates of characteristic point coordinate straight line (long)

straight line (short)

arc longer than the predetermined distance irregular points

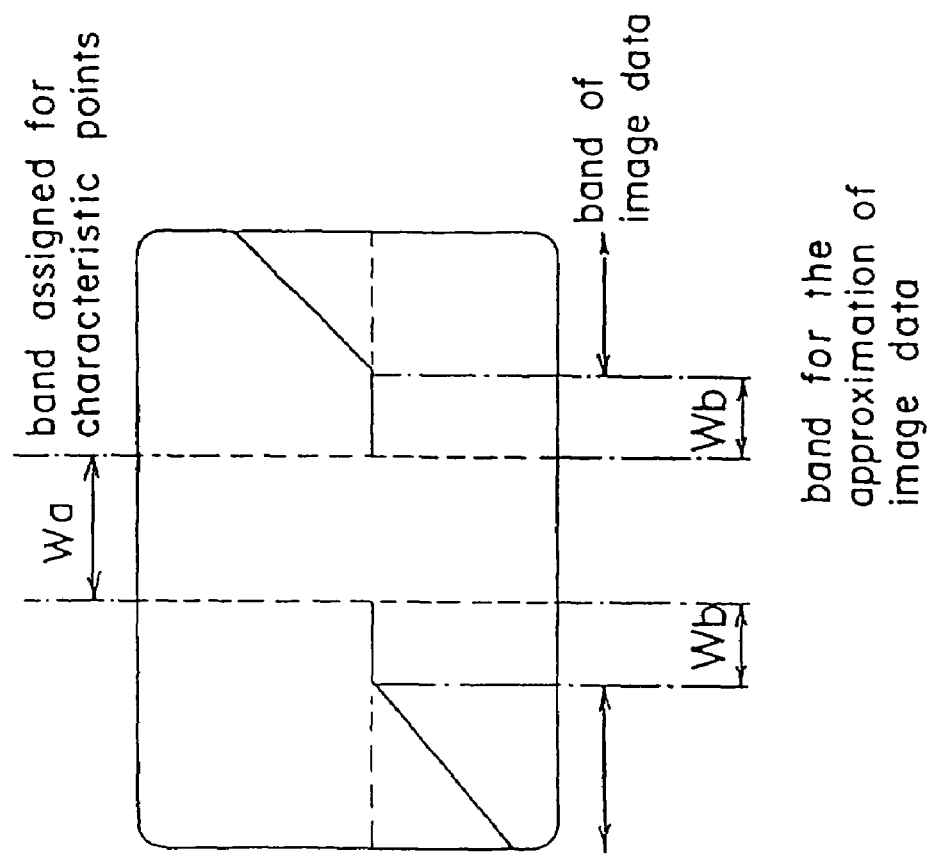
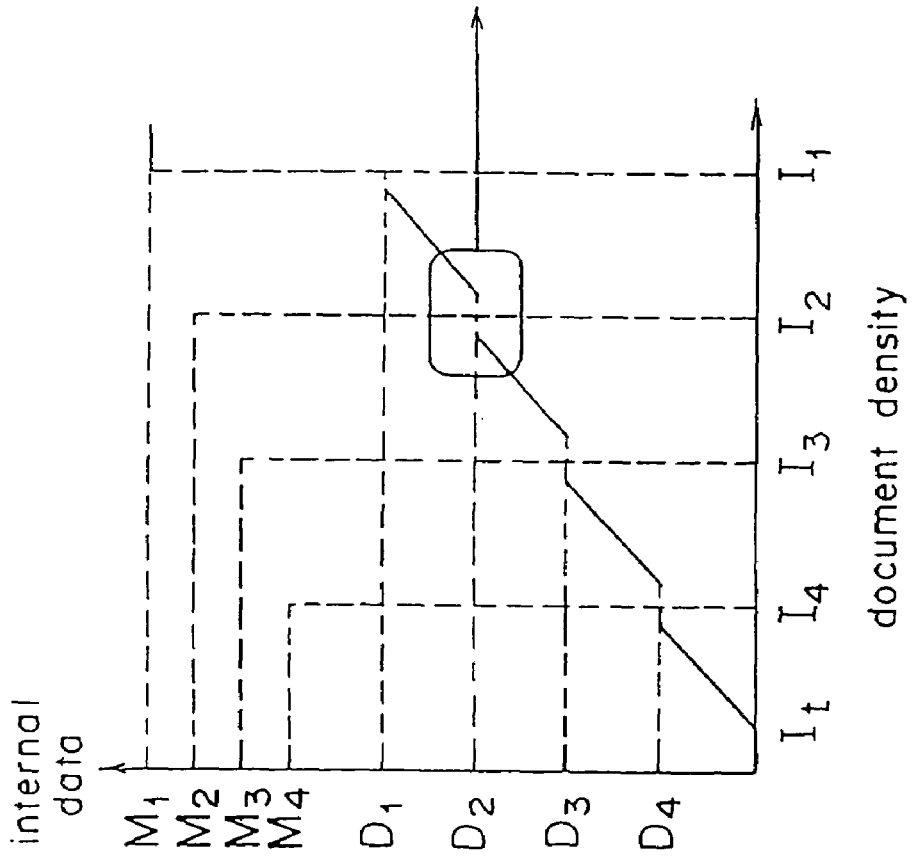
Fig. 32(a)
Fig. 32(b)

Fig. 33(a)  Fig. 33(b)
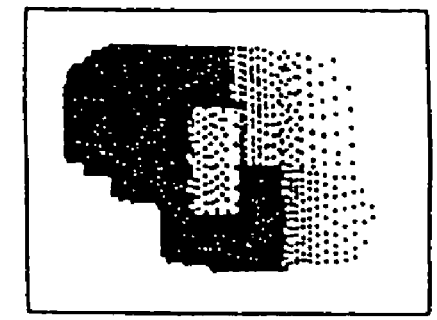
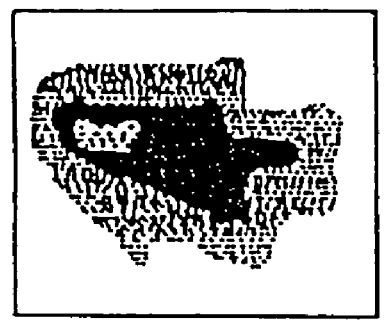
Fig. 34(a)  Fig. 34(b)
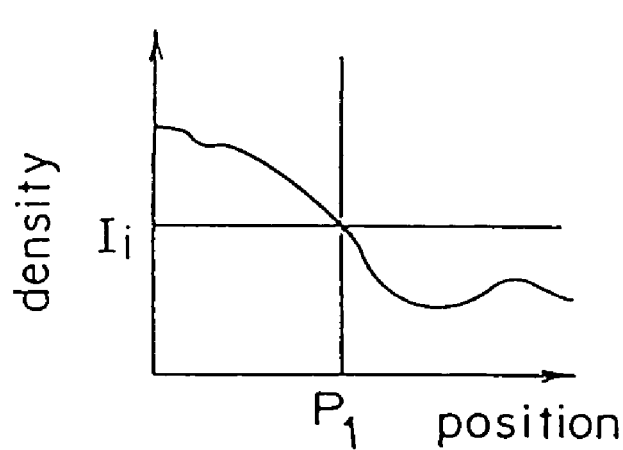
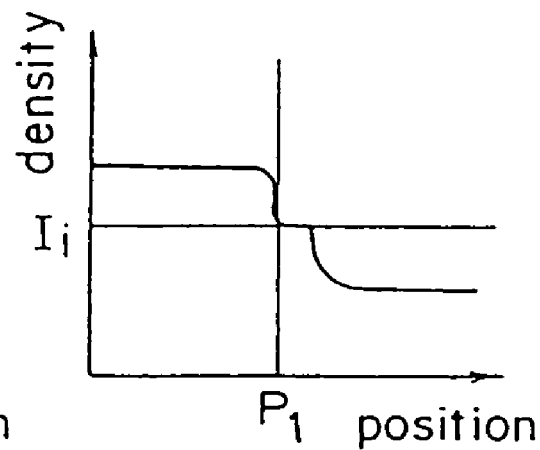

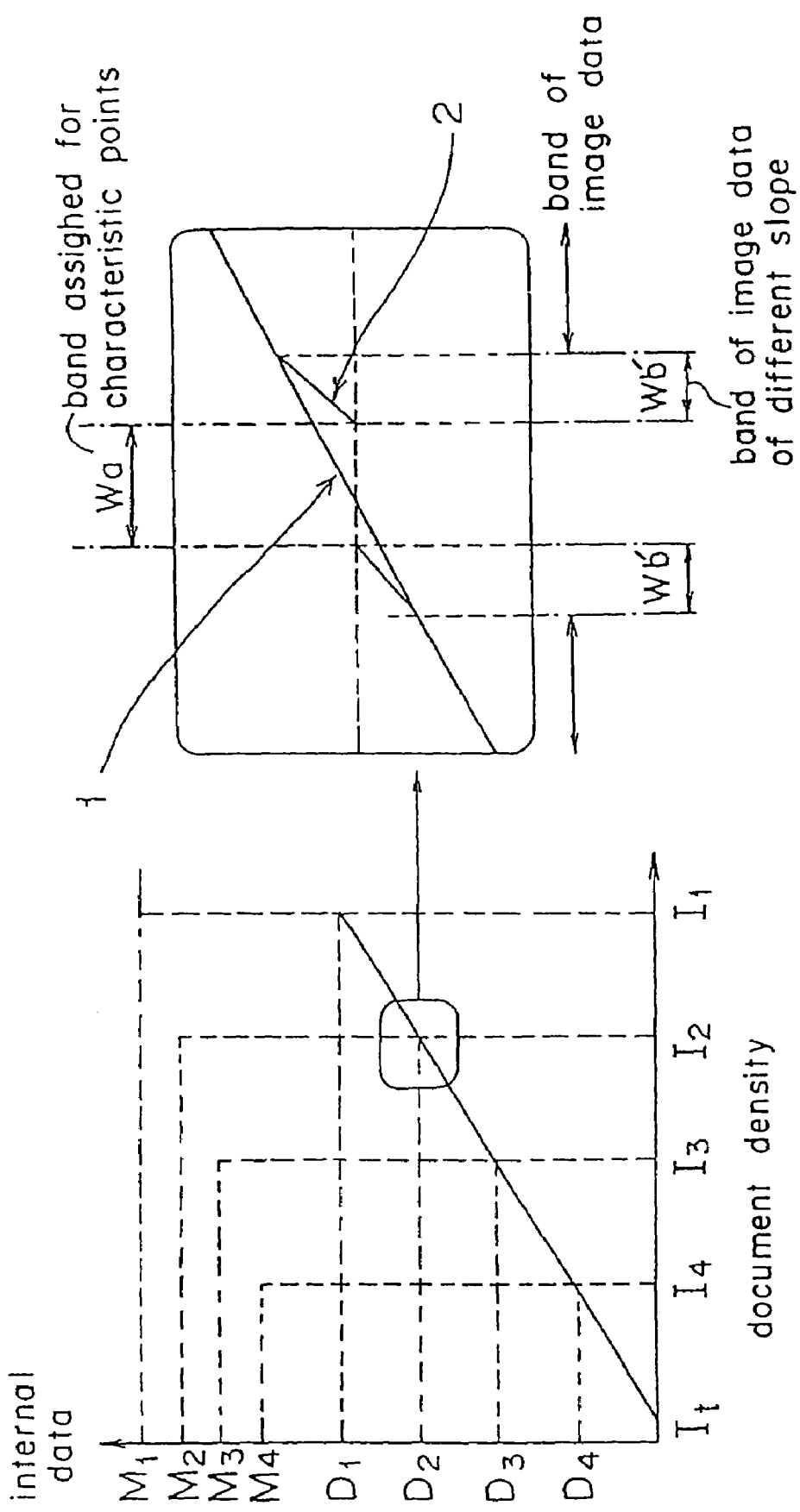

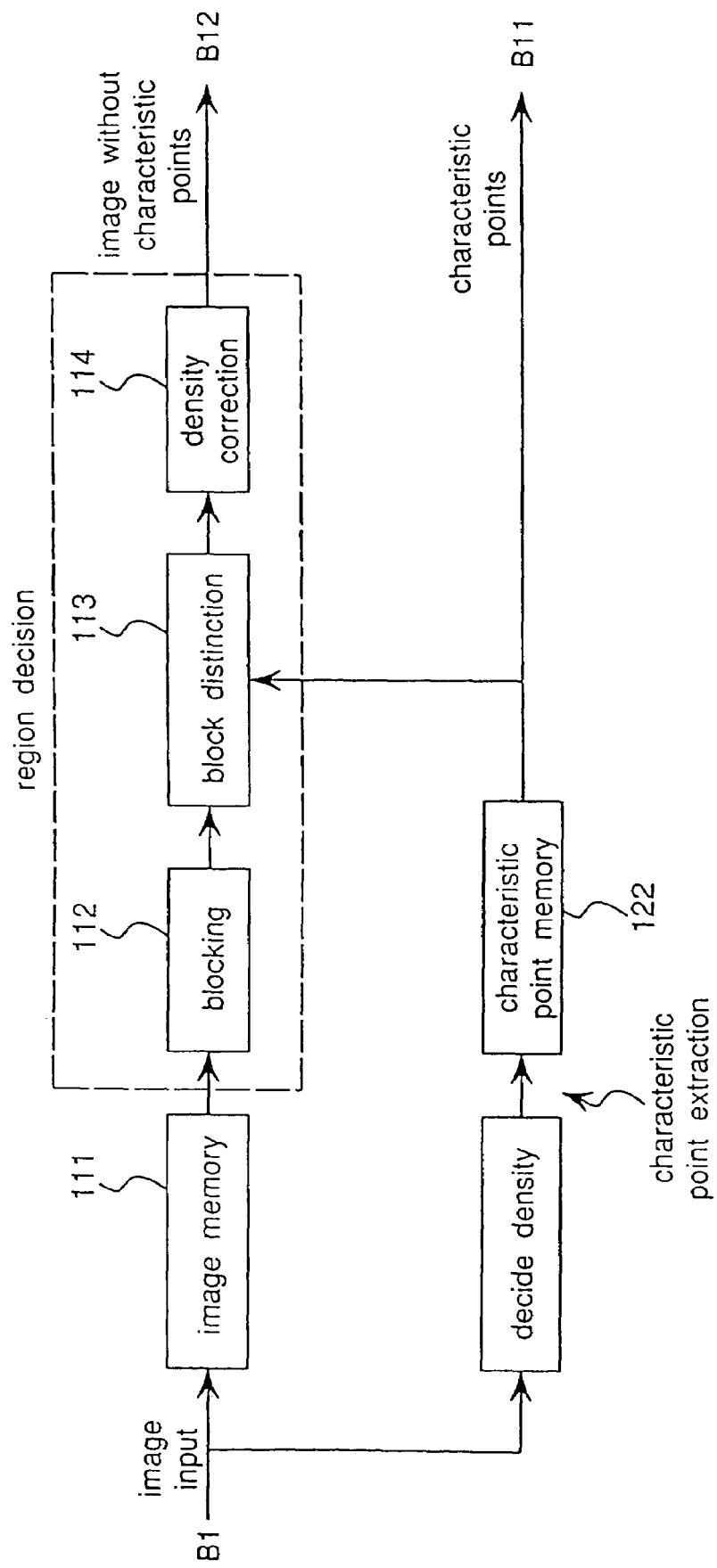

IMAGE PROCESSOR

RELATED APPLICATIONS

This is a division of application Ser. No. 09/639,360 filed Aug. 14, 2000 now U.S. Pat. No. 6,771,812, which is a division of application Ser. No. 08/987,267, filed Dec. 9, 1997, now U.S. Pat. No. 6,185,326, which is a division of application Ser. No. 08/429,469, filed on Apr. 27, 1995, now U.S. Pat. No. 5,956,420, which is a continuation of Ser. No. 07/995,204, filed Dec. 22, 1992, abandoned.

BACKGROUND OF THE INVENTION

1. Field of the Invention

The present invention relates to a digital image processor such as a digital printer and a data processing thereof.

2. Description of the Prior Art

In a digital printer or the like, digital image data are read by an image reader section, modified by an image processor section according to the print characteristics and edited according to the editing mode specified with an operational panel. After the data processing, the image is printed on a paper by a printer section.

In the image reader section, a digital image of a document is read at a specified resolution. Therefore, the information on the document which exceeds the resolution is lost inevitably when the image is read. In the printer section, the image data can not be reproduced with perfect fidelity. Therefore, an image printed on the paper is reproduced by the printer, the information is lost inevitably to a certain degree and the quality of the image regenerated by the printer is degraded.

The degradation of image may not be a large problem when the image is reproduced from the original document. However, when the image is reproduced again from the hard copy, the quality of the image may be degraded to a large degree. Some printers use an outline font. However, even if an image is reproduced with fidelity with use of outline font, the quality of the hard copy of the reproduced image is degraded, especially as to the contour.

There is no problem if the copying is performed from the digital source in a floppy disk or the like. However, a hard copy (analog image) is reproduced again in many cases as to the compatibility or the convenience. Therefore, it is desired to improve the quality of a hard copy.

In U.S. Pat. No. 4,847,641, a contour line of an image is improved by estimating the original pattern or by using smoothing. However, this method cannot restore the deformed contours which occurred on reading and on printing.

SUMMARY OF THE INVENTION

An object of the present invention is to provide an image processor which does not degrade an image when it is reproduced from a hard copy.

Another object of the present invention is to provide an image processor which can add additive information to the original image data for restoring contours when the image is reproduced.

In one aspect of an image processor according to the present invention, additive information on the contour of an image is generated and embedded in the reproduced image in a hard copy. For example, characteristic points of a density or a color different from that of the image are added inside a contour of the image. When a hard copy including the additive information is reproduced, the additive information is extracted from received image data on the hard copy, and the contour of the image is restored from the additive information extracted from the received data. Preferably, the additive information is embedded again for the next generation of the reproduced image.

In another aspect of the present invention, image regions including no additive information on contour are distinguished, and additive information is generated for the image regions without additive information. On the other hand, for the image regions including additive information, the additive information is extracted and an image is restored on basis only of the additive information. Then, the image data in the restored image regions and those of the non-restored image regions are synthesized and sent for reproduction.

In a third aspect of the present invention, a read error is detected, in a comparison of the restored data with the received image data, when the difference of the comparison is larger than a predetermined value. In case of a read error, the received image data is corrected by generating additive information on contour for the region wherein the read error occurs. If necessary, the read correction can be prohibited.

An advantage of the present invention is that contours of an image lost in a hard copy can be restored as far as the additive information can be extracted from the hard copy.

Another advantage of the present invention is that the image quality is not degraded if the reproduced hard copy is reproduced repeatedly.

A third advantage of the present invention is that even for a document such as a patched image including image regions without additive information on contour, the as-received image data on the image regions are synthesized with the image data of the other image regions restored from the additive information.

A fourth advantage of the present invention is that the image quality of a half-tone image is not degraded in a reproduced hard copy.

A fifth advantage of the present invention is that a read error can be detected and corrected for an image including additive information on contour.

BRIEF DESCRIPTION OF THE DRAWINGS

These and other objects and features of the present invention will become clear from the following description taken in conjunction with the preferred embodiments thereof with reference to the accompanying drawings, and in which:

FIG. 1 is a drawing of an example when the density of characteristic points is thicker than that of the pattern;

FIGS. 2(a), 2(b), 2(c) and 2(d) are diagrams for explaining schematically the processing on the image shown in FIG. 1;

FIGS. 9(a) and 9(b) are diagrams of an example of blocking;

FIGS. 10(a) and 10(b) are diagrams of block synthesis for characteristic points;

FIGS. 32(a) and 32(b) are diagrams of density of characteristic points when a plurality of density bands is used;

FIGS. 33(a) and 33(b) are drawings of an image wherein the density changes gradually and of an image wherein the density is constant for each region, respectively;

FIGS. 34(a) and 34(b) are graphs of density change of the images shown in FIGS. 33(a) and 33(b);

FIG. 35(a) is a graph of an example of the density change and FIG. 35(b) is an enlarged view of a part of FIG. 35(a);

FIG. 36 is a diagram of a flow of the processing of distinguishing an image relevant to characteristic points;

DETAILED DESCRIPTION OF THE PREFERRED EMBODIMENTS

Figure 3A:
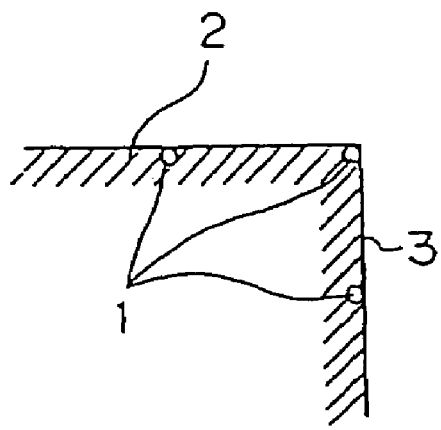
FIGS. 3(a), 3(b), 3(c) and 3(d) are diagrams of examples of characteristic points.
Figure 3B:
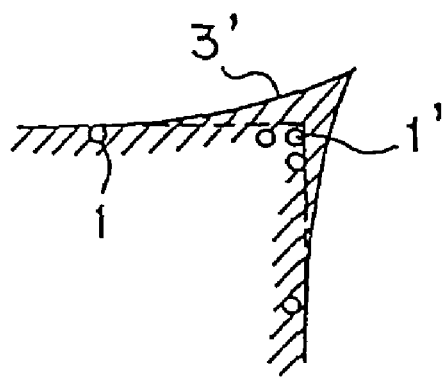
Figure 3C:
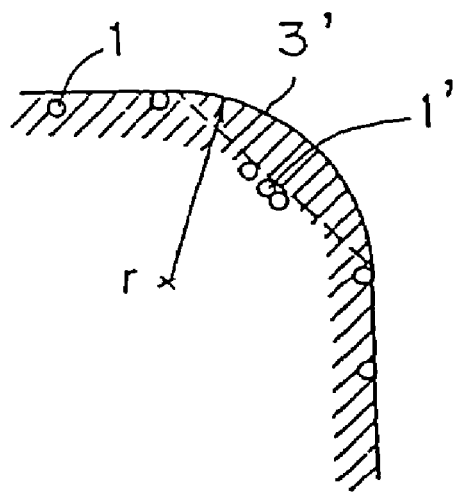
Figure 3D:
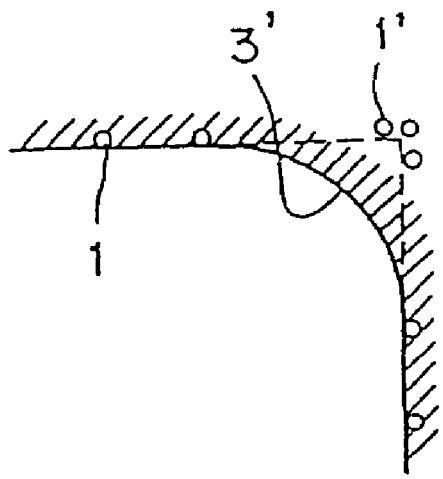

Referring now to the drawings, wherein like reference characters designate like or corresponding parts throughout the several views, embodiments of the present invention will be explained in the following order:

A. Addition of Characteristic Points and Contour Restoration
B. First Embodiment
 (a) Structure of image processor
 (b) Image analysis
 (c) Image restoration
 (d) Addition of characteristic points
C. Second Embodiment
 (e) Generation and addition of characteristic points when a hard copy is obtained
D. Third Embodiment
 (f) Standard pattern of density
 (g) Addition of characteristic points at low densities for a half-tone image
 (h) Extraction of characteristic points in case of continuous density change
 (i) Addition of characteristic points for a half-tone image with continuous density change
E. Fourth Embodiment
 (j) Addition of characteristic points to an original document
F. Fifth Embodiment
 (k) Error detection and correction A. Addition of Characteristic Points and Contour Restoration A reproduced image is degraded when a reproduced document is used successively as an original to be copied because the pattern of the image cannot be read or printed correctly. Because the reading is performed at a specified resolution, the image information of a continuous image is lost partly. Then, in the present invention, additive information on contour (digital or discrete information) is embedded in the image data (analog or continuous information), and the original image can be reproduced by using the additive information. That is, the additive information is added to the analog image of the document.

Both analog information (image data) and digital information (additive information) are read from a hard copy, and the image is restored by extracting the digital information, and the original image can be restored in a hard copy reproduced by using the additive information. Read errors of the analog information are corrected with use of the digital information. In the restoration, analog image data is not needed.

When the image of a hard copy is printed to get another hard copy, the extracted digital information is added again to the analog image data. Then, even if a true copy cannot be obtained, the image data can be corrected as far as the digital information is not lost when the hard copy is used again for copying. That is, the image quality is not degraded if the reproduced hard copy is reproduced repeatedly.

The digital information has to be added so as not to deform the original image pattern when a user sees a hard copy. In concrete, characteristic points of a minute size which represent the contour of the image pattern are added to an image so as to be located near the contour of the original pattern or image, as shown in FIG. 1 for example. The characteristic points are expressed with a density or a color different from that of the original pattern. The size of the characteristic points is determined not so large to deform the pattern for naked eyes, but large enough to be read surely when the hard copy is read for printing.

FIG. 1 shows an example when the density of characteristic points 1 is thicker than that of the pattern (hatched area) 2. The pattern 2 represents a character "a", and characteristic points 1 are added to the character around the contour, as shown in an enlarged drawing in the right side.

FIG. 2 shows schematically the data processing of the image shown in FIG. 1. When a document shown in FIG. 2(*a*) is read, characteristic points are extracted from the digital read data as shown in FIG. 2(*b*). Next, a contour is calculated, as shown in FIG. 2(*c*), so as to circumscribe the characteristic points and the image is restored as shown in FIG. 2(*d*). If the restored image data is sent to another instrument, both restored image data (FIG. 2(*d*)) and extracted characteristic points FIG. 2(*b*) are sent.

Examples of characteristic points 1 are displayed in FIG. 3(*a*)-3(*d*). Characteristic points 1 are arranged in positions inscribing the contour of a pattern 2. The reference numeral 3 denotes a restored contour. In the examples of FIGS. 1 and 2, the shapes of the characteristic points 1 are squares. However, they are expressed below as circles for convenience.

Usually, a characteristic point is arranged at a corner of the pattern 2 and other characteristic points are located along two lines from the corner, as shown in FIG. 3(*a*).

On the other hand, FIGS. 3(*b*)-(*d*) show examples for irregular processing to be explained later. If there are three characteristic points within a predetermined very short distance, this means that the contour near the characteristic points is an object of the irregular processing, and this can reduce the number of the characteristic points. It is clear that a part of characteristic points is not located at an edge of the contour of the pattern. In case of FIG. 3(*b*), there are three special adjacent characteristic points 1' which form a rectangle at a convex corner. The pattern 3' restored after the irregular processing is a sharp pattern including the characteristic points 1' inside the contour. In case of FIG. 3(*c*), there are three special adjacent characteristic points 1' which form a straight line inside the contour, and the restored deformed contour is obtained by connecting the line with characteristic points in the forward and backward directions with use of an arc of radius "r". This processing has no advantage when the original curve is approximated with an arc. Further, in case of FIG. 3(*d*), there are three special adjacent characteristic points 1' which form a rectangle, similarly to that shown in FIG. 3(*b*), but they are located at a concave corner. In this case, the pattern 3' restored after the irregular processing is a curve connecting smoothly the line with characteristic points in the forward and backward directions.

Figure 4:
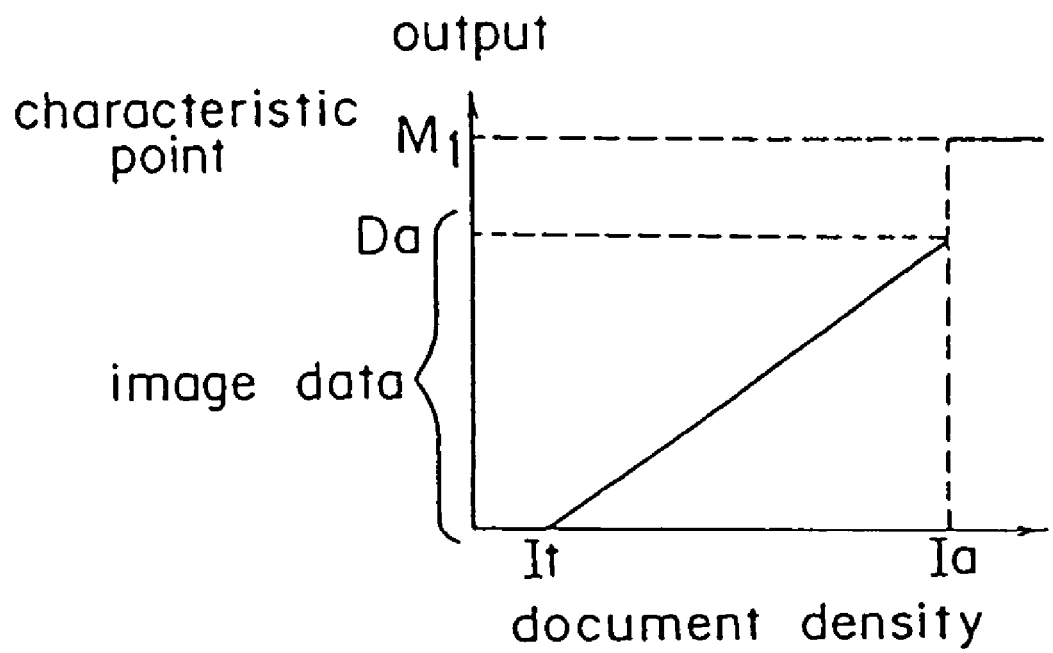
FIG. 4 is a graph of the decision of a multi-level document image.
Figure 5:
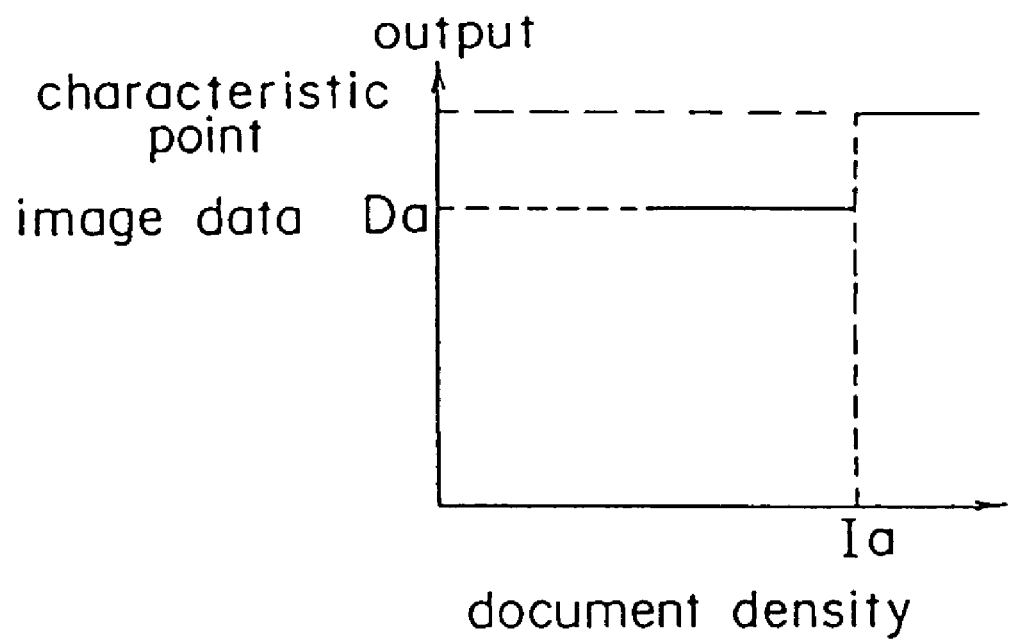
FIG. 5 is a graph of the decision of a bi-level document image.

The density of a characteristic point 1 is set to be higher than that of image data. FIG. 4 shows the decision output of the multi-level image data of a document, wherein the density of a characteristic point 1 is set to be Ia or higher. Therefore, if the read density of a document is Ia or higher, the decision for a characteristic point (density M1) is output. However, if the density of a document is low, characteristic points of the density of Ia or more may not be added because they are liable to be regarded as noises. FIG. 5 displays another example of the decision of characteristic points for a bi-level pattern only of characters or the like. That is, the characteristic points 1 are decided for a document density of Ia or more, where the density Ia is higher than the densities for the characters.

In the embodiments explained below, points which inscribe a contour are used as characteristic points. However, characteristic points which do not inscribe the contour may also be used.

B. First Embodiment (a) Structure of Image Processor

In a digital copying machine, digital image data are read by an image input section such as an image reader section, modified by an image processor section according to the print characteristics and edited according to the editing mode specified with an operational panel. After the data processing, the image is printed on a paper by a printer section such as an electrophotographic printer.

Figure 6:
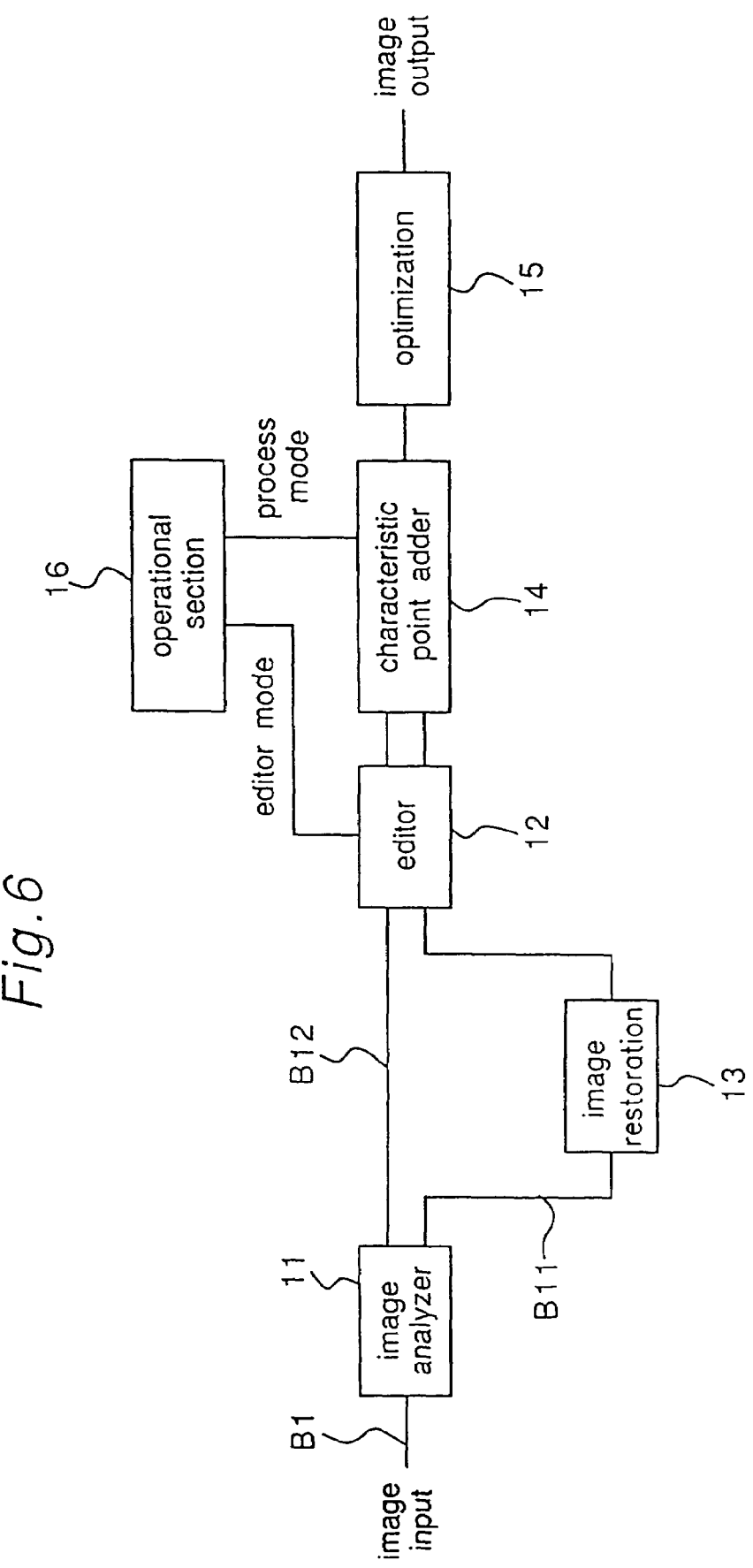
FIG. 6 is a block diagram of an image processor of a first embodiment.

FIG. 6 shows a block diagram of an image processor of a first embodiment, wherein an image analyzer 11 extracts characteristic points on digital image data received via a bus B1 from the image input section and distinguishes regions from the extracted characteristic points 1. The image data area is separated in restorable regions including characteristic points and non-restorable regions without characteristic points. In the non-restorable regions, the as-received input image data are sent through for a subsequent processing, while in the restorable regions, the input image data are not used and image data are restored by an image restoration section 13 according only to the extracted characteristic points. The two kinds of image data are synthesized by a characteristic point adder 14, and the extracted characteristic points 1 are added if a process mode is set by an operational section 16. If plural densities of characteristic points can be used, one of the densities closest to the density around the characteristic point is selected. If necessary, an editor 12 edits the restored data and the image data in the non-restorable regions independently for rotation, enlargement or the like by adjusting the positions of the two kinds of data. Then, the edited data are synthesized in the characteristic points adder 14. The characteristic points 1 may not be added if instructed in a process mode. Finally, the image density is corrected in an optimization section 15 by a smoothing processing or the like according to the designated process mode to be sent to a bus B2.

(b) Image Analysis

Figure 7:
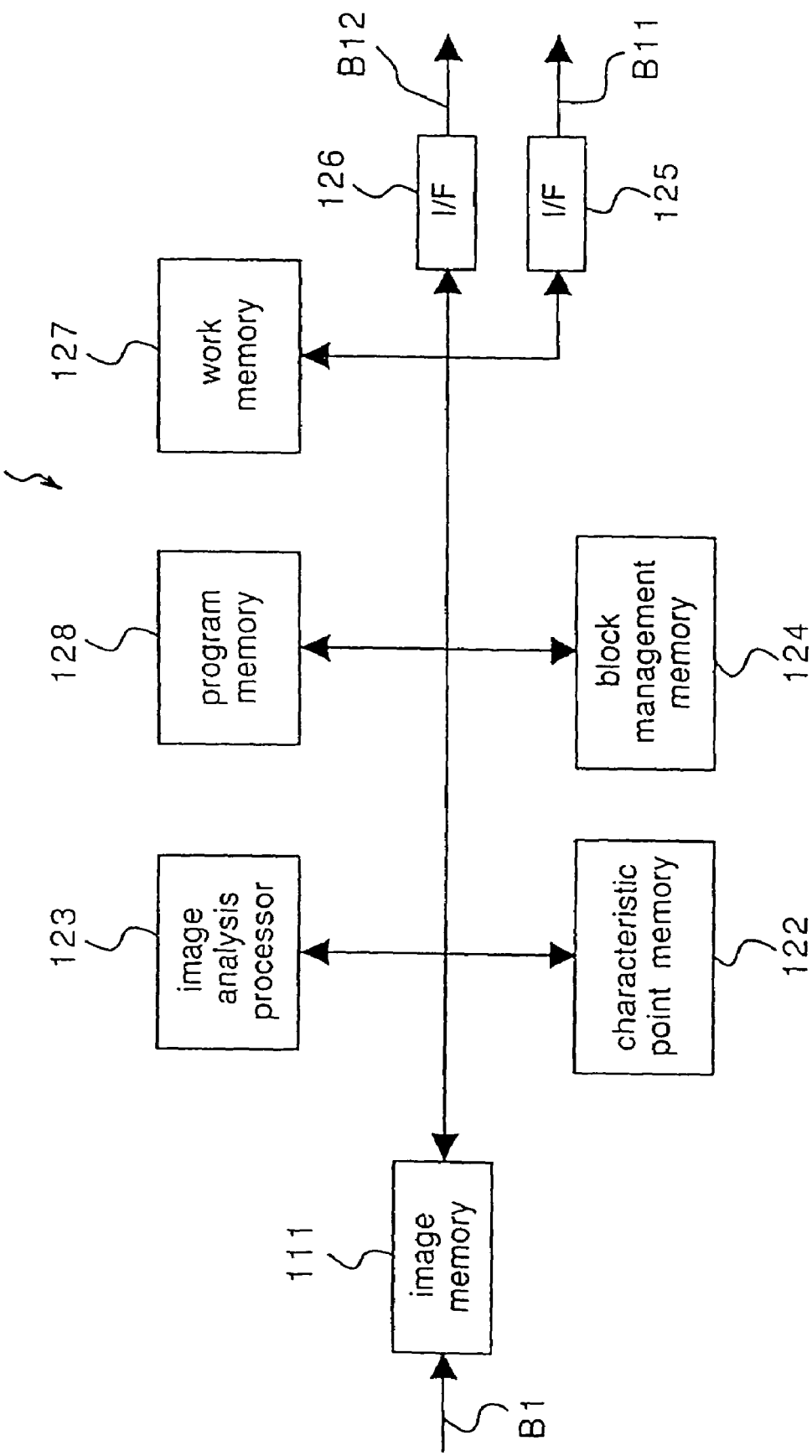
FIG. 7 is a block diagram of the image analyzer.

FIG. 7 shows a block diagram of the image analyzer 11 for characteristic point extraction and region distinction. The image analyzer 11 includes an image memory 111 for storing digital image data received, a characteristic point memory 122 for storing the position data of characteristic points 1, an image analysis processor 123 for image analysis, a program memory 128 for storing programs executed by the image analysis processor 123, a block management memory 124 for storing block management data obtained by examining the regions of a continuous image, a work memory 127 used for the image analysis, an interface 126 for sending the image data of non-restorable regions without characteristic points and another interface 125 for sending the coordinates of the extracted characteristic points via a bus B11.

The image analysis processor 123 starts its processing after data are written in the image memory 111. It performs blocking by examining the regions of a continuous image, extracts characteristic points and distinguishes image blocks not including characteristic points. The block management data are stored in the block management memory 124, and the position data of the extracted characteristic points are stored in characteristic point memory 122. After the image analysis completes, the results are sent through the two interfaces 125 and 126.

Figure 8:
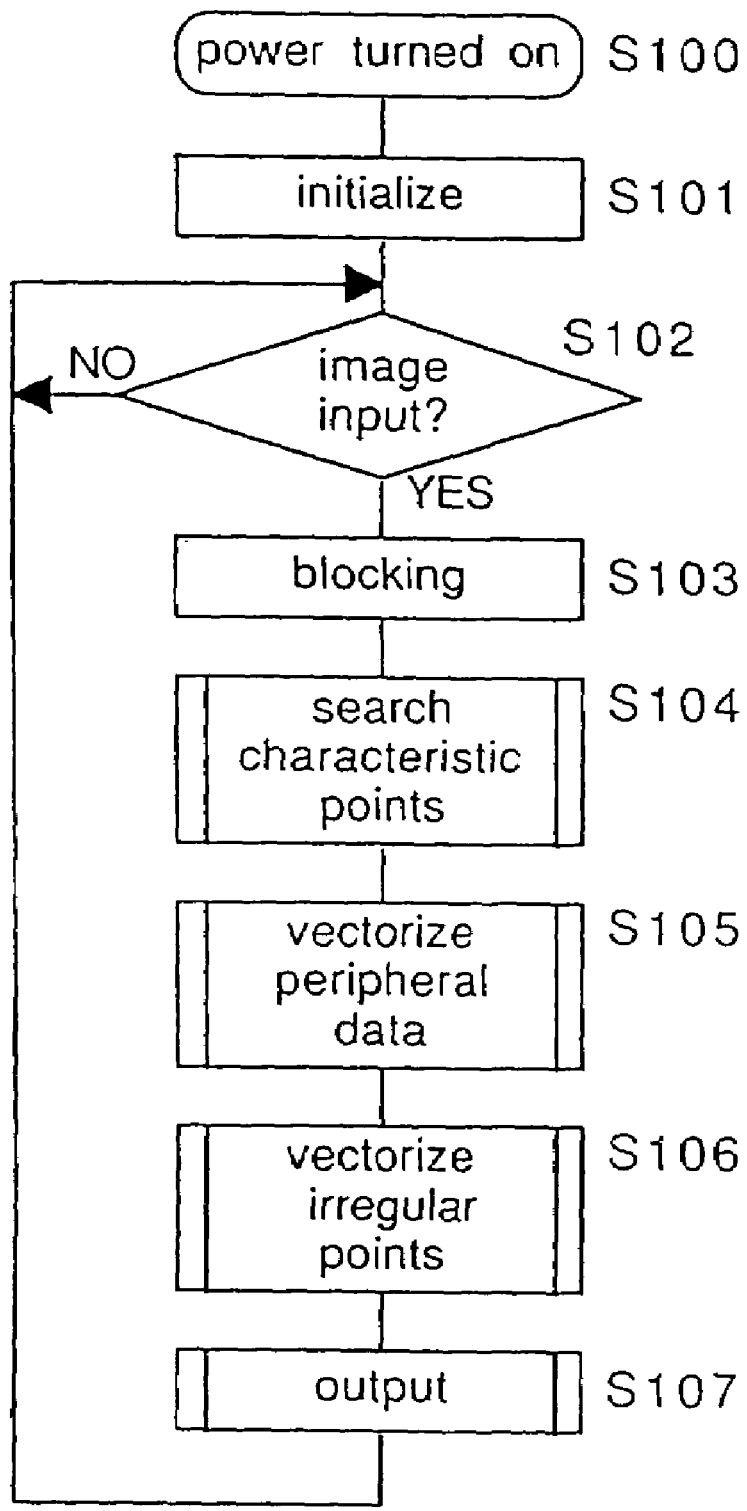
FIG. 8 is a flowchart of the image analysis processor.

FIG. 8 shows a flow of the image analysis processor 123. When the electric power is turned on (S100), the initialization is performed first (S101). Then, there is a wait for an input of image data (S102), and when image data is received, blocking (S103), search of characteristic points (S104), vectorization of adjacent data (S105), vectorization of irregular points (S106) and output processing (S107) are performed successively, and the flow returns to S102 to repeat the above-mentioned steps.

(b-1) Blocking

Figure 11:
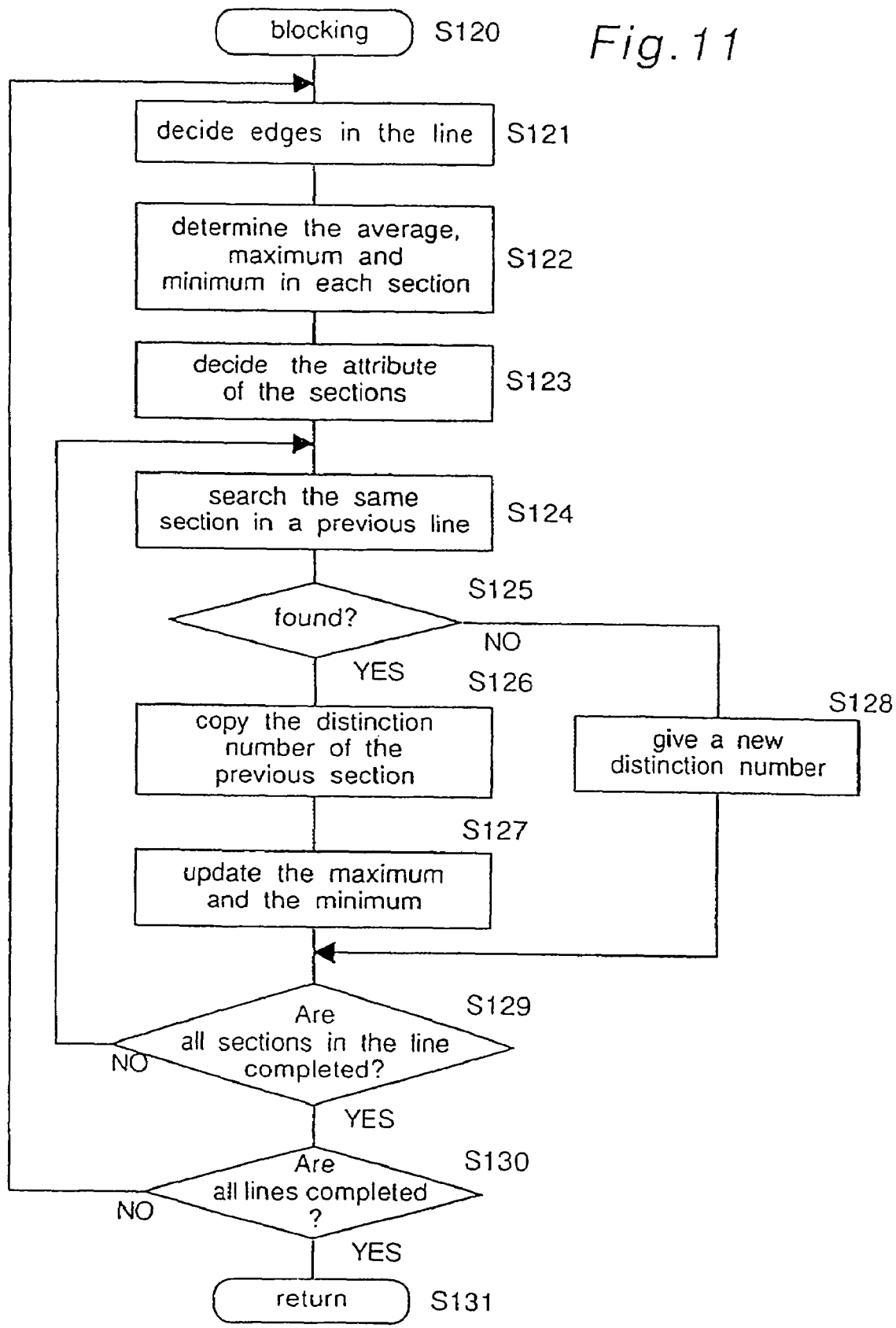
FIG. 11 is a flowchart of the blocking processing.

The image analysis processor 123 examines the regions of a continuous image stored in the image memory 111 and divides the region into blocks (see FIG. 11).

It is preferable that the blocking is performed after smoothing the image data because the blocking is affected largely by noises. The block management information can be used in block distinction processing to distinguish non-restored image (refer FIG. 31).

The condition of a non-restored block is that the attribute is a slope and that no characteristic flags are set in the block. For the blocks which satisfy this condition, not the restored image, but the original image data in the image memory 111 is used for reproduction.

In the blocking, first, the image data stored in the image memory 111 is scanned in line units, and if the density is found to change by an amount more than a predetermined amount in a predetermined narrow section during the scan, it is regarded as an edge of a block. Both the starting point and the last point of a line are regarded as edges. In an example shown in FIGS. 9(a) and 9(b), the result of blocking is shown in FIG. 9(a), wherein the two boundaries of a block are represented by marks "<" and ">". Further, "a", "b" and the like represent the names of a restoration distinction number given in series from the start of a line. The restoration distinction number will be explained later.

Next, the maximum, the minimum and the average of density data included in a block (section) from an edge to the next edge are calculated.

Then, an attribute is given to a block according to the maximum and the minimum. If the difference between the maximum and the minimum is within a predetermined range, the block is decided to be a uniform density section (the attribute is flat), otherwise it is a section of continuously varying density (the attribute is a slope). A section is managed by the block management memory 124 which stores the following information: restoration distinction number, characteristic point flag, starting point, last point, average density, maximum density, minimum density and attribute (flat and slope). The characteristic point flag represents whether a characteristic point is included in the block or not, and it does not have an initial value.

After the decision on the sections (blocks) in a line is complete, the results are compared with those of the line before the present line, and the same sections are connected for blocking.

If a block satisfies all the following conditions, it is regarded the same as the block to be compared: (1) The sections are adjacent (or there is a lapping part between the starting point and the last point of the two lines). (2) The difference of the average densities are less than a predetermined value. (3) The difference between the maximum and minimum densities in the two sections is less than a predetermined value. (4) The attributes are the same. However, in cases of the two sections both of slope attribute, the conditions (2) and (3) may be neglected.

If the block is decided not to be same, an intrinsic restoration distinction number is given as a new block. The blocks in the first line are all regarded as new.

In the example shown in FIG. 9(a), the blocks in the first line are regarded as new and restoration distinction number "a", "b", "c", and the like are given to the block successively. The blocks in the second line are regarded as the same block as "a", "b", "c", and the like in the first line. The third line is also processed similarly. A block of restoration distinction number "d" appears in the fourth line. As shown in FIG. 9(b), the block is regarded as the same as a block of restoration distinction number "a", and the block of "c" in the first to third lines are regarded as blocks of "a".

After the blocking is completed for all the lines, characteristic points are removed from the image data. (Practically, the starting point or last point of an adjacent block is changed to synthesize a region).

If the density of a point in a block of flat attribute is determined to be within a predetermined range assigned for characteristic points, it is regarded as a characteristic point. The characteristic point is regarded to belong to a block having the longest contact length among adjacent blocks in contact with the characteristic point. If there are blocks of the same longest contact length, it is regarded as belonging to a block having an average density closest to the density of the characteristic point. The characteristic point flag of the block which incorporates the block of characteristic point is set as "1".

The information on the characteristic point which has been processed is discarded.

In an example of FIG. 10(a), there are found blocks including characteristic points (represented as "m"). As shown in FIG. 10(b), the blocks including a characteristic point are regarded as same as the blocks of "b", and the starting points thereof are changed to synthesize blocks.

At the same time as the removal of characteristic points, the coordinate of characteristic point and the density for restoration can be obtained. The coordinate is determined for a center of the characteristic point block or on a point on the outer periphery adjacent to the block which absorbs the characteristic point block. In the example shown in FIG. 10(b), the candidates of characteristic point coordinate locate on the center of outer periphery. It is determined beforehand for each system what point is adopted for the coordinate and how a characteristic point is added.

FIG. 11 shows a flow of blocking (S103 in FIG. 8) wherein the blocking, extraction of characteristic points and block distinction are performed at the same time. First, edges are decided in a line (S121). Next, the average, maximum and minimum in each block (section) determined from the edges are calculated (S122), and the attribute of the sections are decided (S123). Then, it is searched if there is the same section in the previous line (S124), and if it is decided that the same section is found (YES at S125), the restoration distinction number of the previous section is copied (S126), and the maximum and the minimum are updated (S127). If it is decided that the same section is not found (NO at S125), a new restoration distinction number is assigned (S128). Then, it is checked if the blocking is completed on all the sections in the line (S129). If not completed, the flow returns to S124 and the next section is processed.

If the blocking is completed on all the sections in the line (YES at S129), it is checked next if the blocking is completed on all the lines. If not completed, the flow returns to S121 and the next line is processed. Otherwise the flow returns to the main flow (S131).

(b-2) Characteristic Point Extraction

In the processing of characteristic point extraction (S104 at FIG. 8) in the image analyzer 11, characteristic points are extracted from the block management memory 124, and they are vectorized or they are converted to vectors along a contour for each contour to be stored in the characteristic point memory 122. The information on each characteristic point includes the following points:

- restoration distinction number (the number of the block synthesized with the characteristic point);
- coordinate (x, y);
- the density to be restored;
- irregular point flag (which represents irregular processing of contour);
- the pointer for denoting the previous characteristic point (for example, a pointer in the counter-clockwise direction along the contour); and
- the pointer for denoting the next characteristic point (for example, a pointer in the clockwise direction along the contour).

Figure 12:
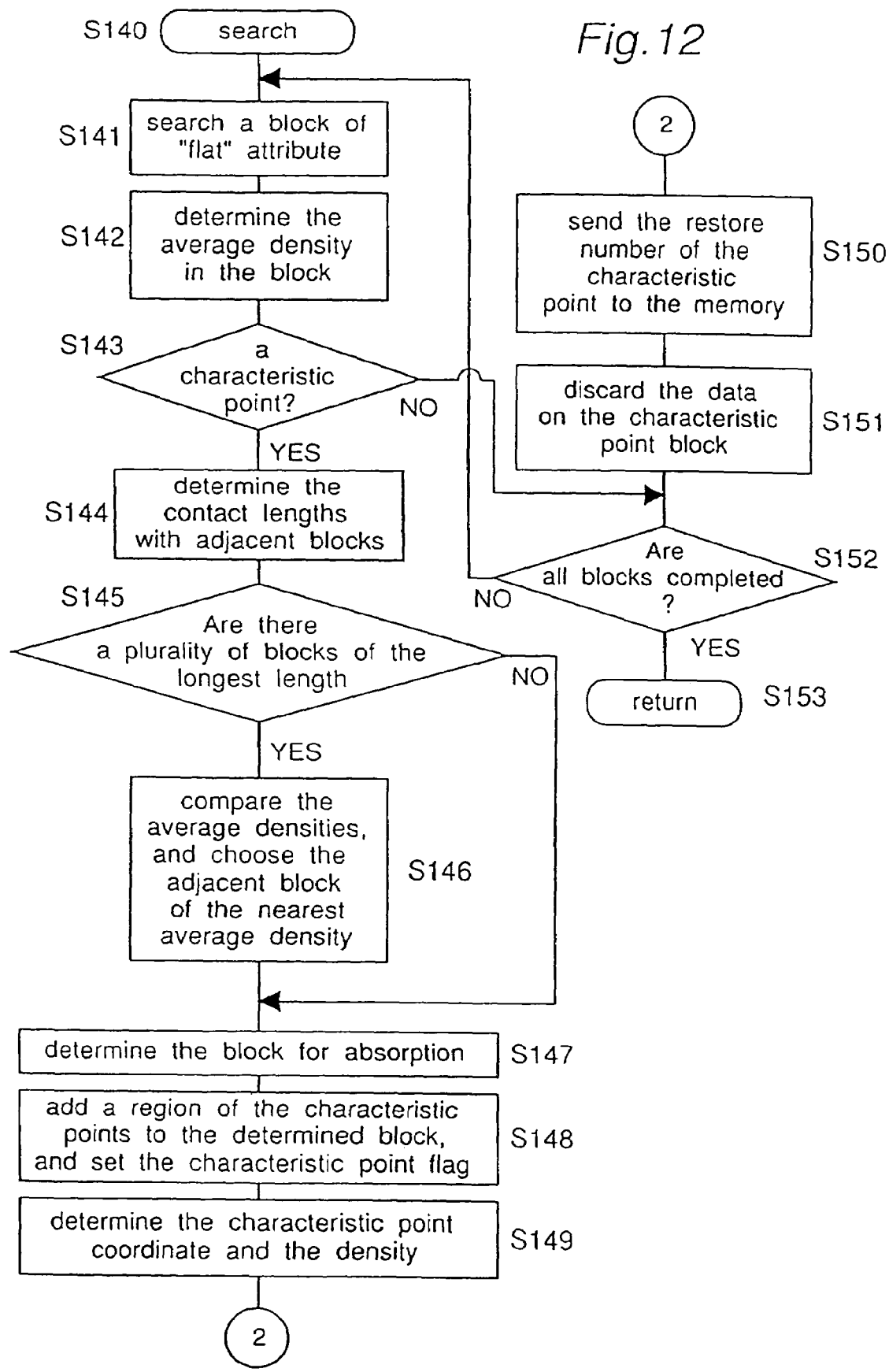
FIG. 12 is a flowchart of the characteristic point search processing.

FIG. 12 shows a flow of the characteristic point extraction. The processing is classified into three parts.

(1) The characteristic point coordinate, the density at the periphery, and the restoration distinction number (block ID) are determined. At this time, the data on the characteristic points in the characteristic point memory are removed.

(2) The characteristic points on or near the contour of a pattern are searched along the contour and vectorized.

(3) Irregular points inside the pattern are searched and are connected to the relevant contour.

In the processing, first, a block of flat attribute is searched (S141), and the average density of the block is determined (S142). Then, it is decided if the block is a characteristic point or not by comparing the average density with a predetermined density (S143). For example, the decision output as shown in FIGS. 4 and 5 is obtained.

If there is decided to be a characteristic point (YES at S143), the contact lengths with adjacent blocks are determined (S144). Then, if there is decided to be a plurality of adjacent blocks of the longest contact length (YES at S145), the average densities of the blocks are compared and the adjacent block of the nearest average density to the density of the characteristic point is chosen (S146). Next, a block for absorbing the characteristic point is determined (S147), the characteristic point region is added to the determined block and the characteristic point flag is set (S148), and the characteristic point coordinate and the density are determined (S149). Then, the restoration recognition number of the characteristic point as well as the above-mentioned information are sent to the characteristic point memory 122 (S150) and the information of the block including the characteristic point is discarded (S151).

Then, it is decided if the processing of all the blocks is completed or not (S152). In the case that there remains no characteristic point (NO at S143), the flow proceeds to S152. If the decision is NO, then the flow returns to S141 for the next block. Otherwise, the flow completes (S153), and returns to the main flow.

(b-3) Vectorization of Peripheral Data

Figure 13:
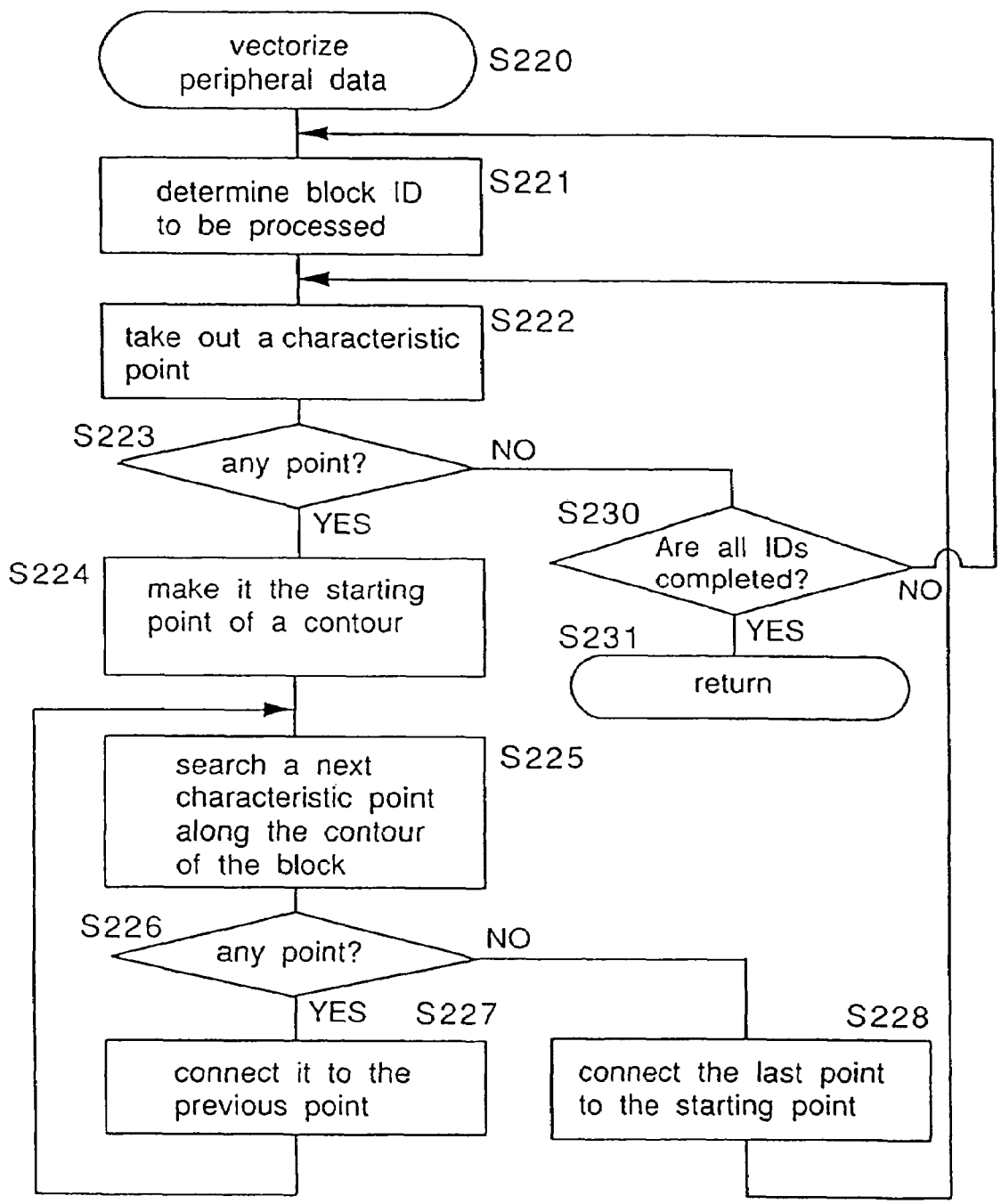
FIG. 13 is a flowchart of the vectorization of peripheral data.

FIG. 13 shows a flow of the vectorization of peripheral data (S105 in FIG. 8). First, the restoration distinction number (ID) of a block to be processed is determined (S221). Next, one characteristic point around a contour is taken out (S222). If it is decided that a characteristic point exists (YES at S223), it is set to be a starting point of the contour (S224). Next, a next characteristic point is searched along the contour of the block (S225), under a condition that the error from the contour is within a predetermined distance. If a characteristic point is found (YES at S226), it is connected to the previous characteristic point (S227), and the flow returns to S225. On the other hand, if no characteristic point is found (NO at S226), the last characteristic point is connected to the starting point (S228), and the flow returns to S222 for the processing of the next contour.

If there is decided to be no characteristic point (NO at S223), it is decided next if all the restoration distinction numbers (or all the blocks) are processed or not (S230). If it is decided that all the restoration distinction numbers are completed (NO at S230), the flow returns to S221 for the processing of the next restoration distinction number. Otherwise the vectorization processing completes (S231), and it returns to the main flow.

(b-4) Vectorization of Irregular Points

Figure 14:
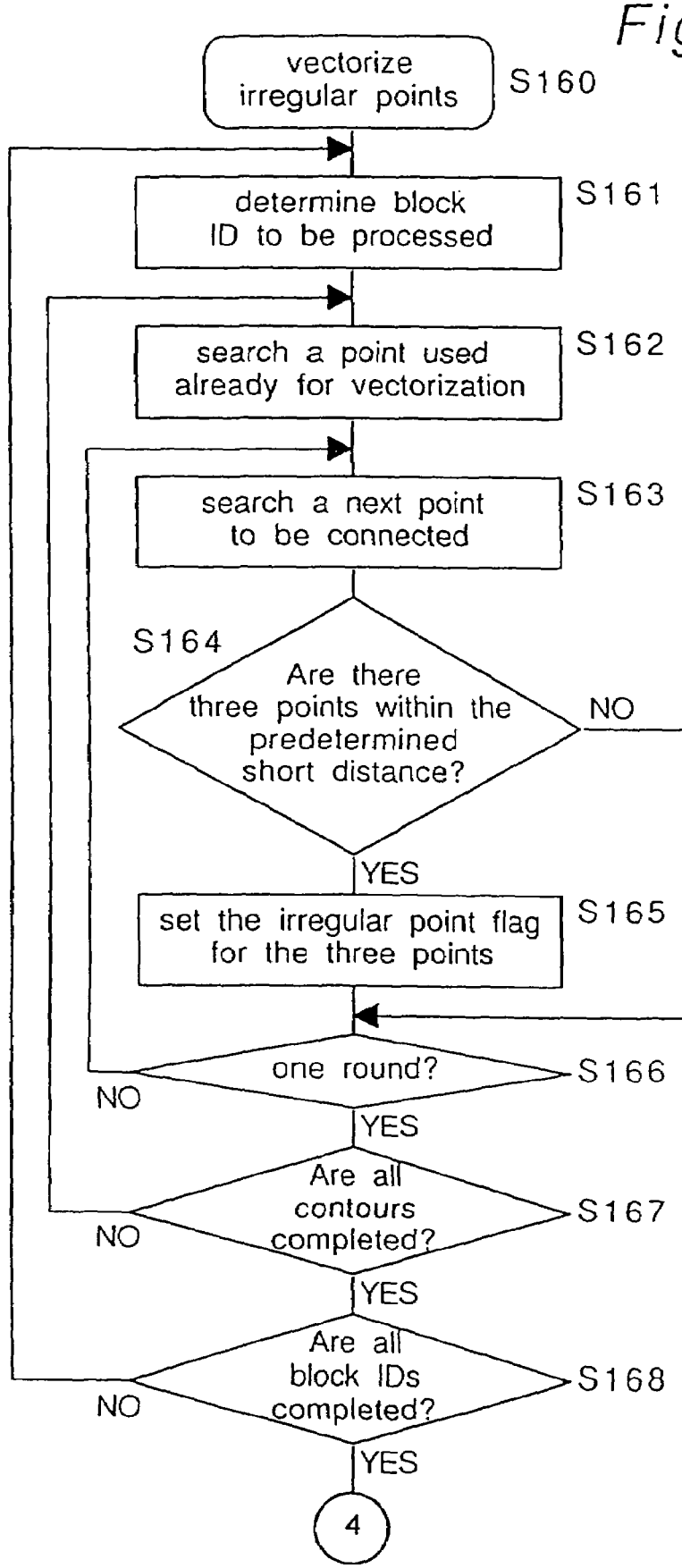
FIG. 14 is a part of a flowchart of the vectorization of irregular points.
Figure 15:
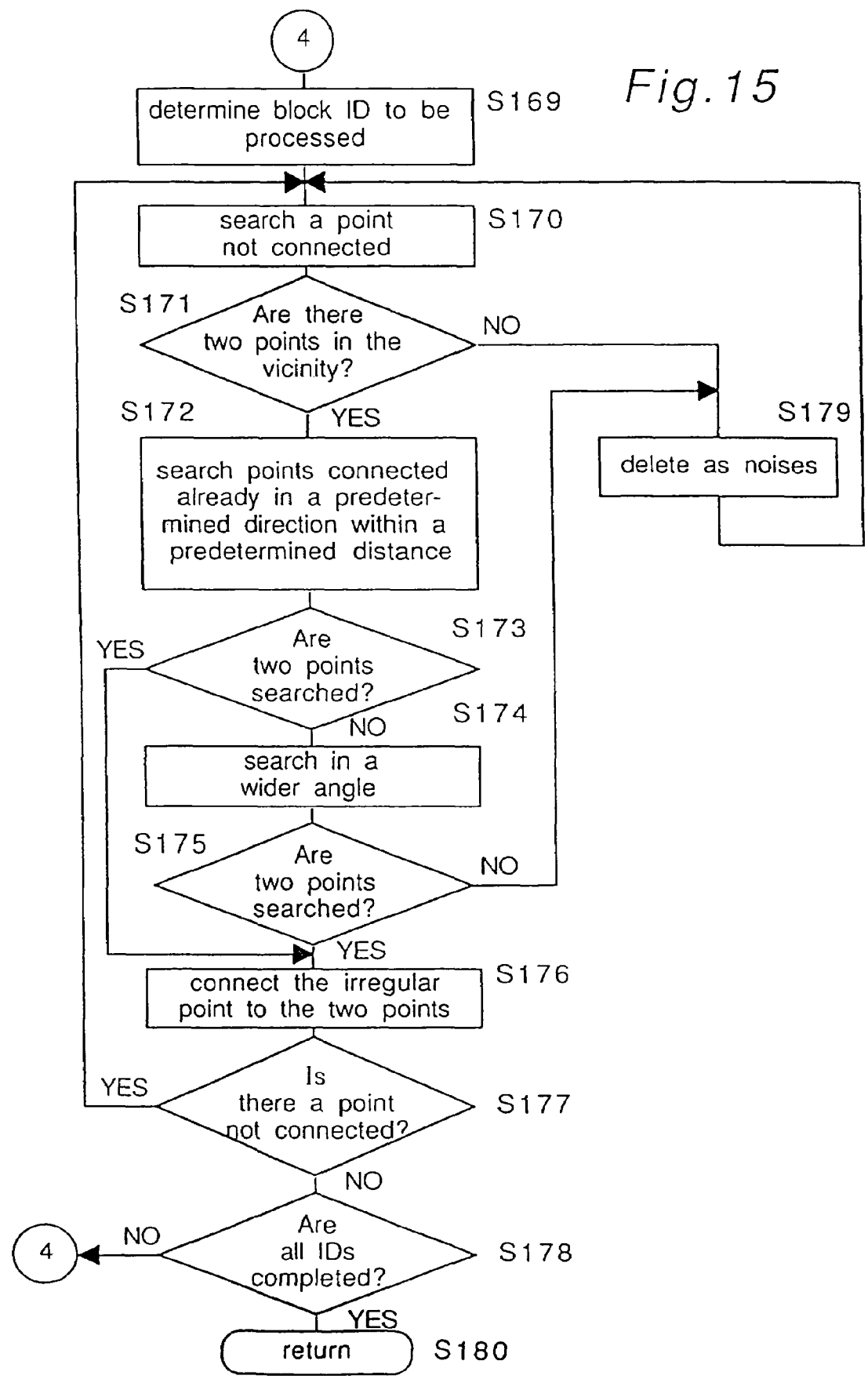
FIG. 15 is the other part of the flowchart of the vectorization of irregular points.
Figure 16A:
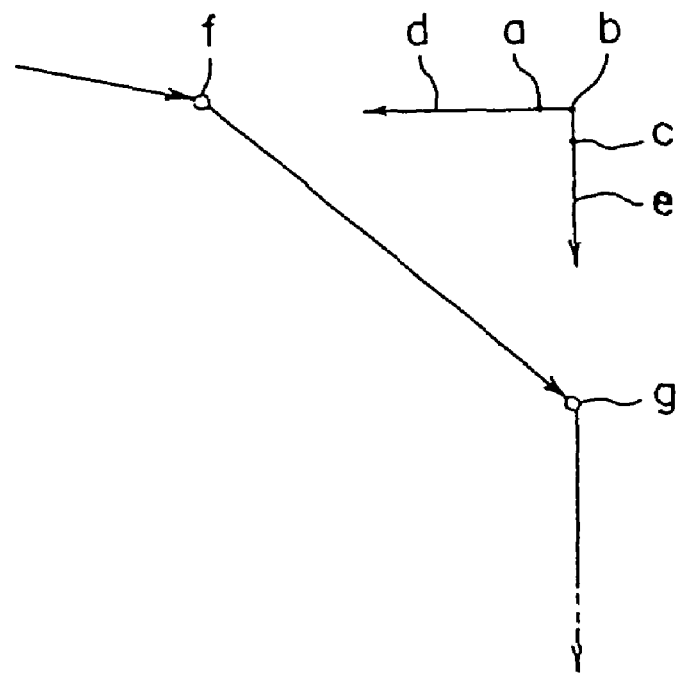
FIGS. 16(a) and 16(b) are diagrams of an example of the vectorization of irregular points.
Figure 16B:
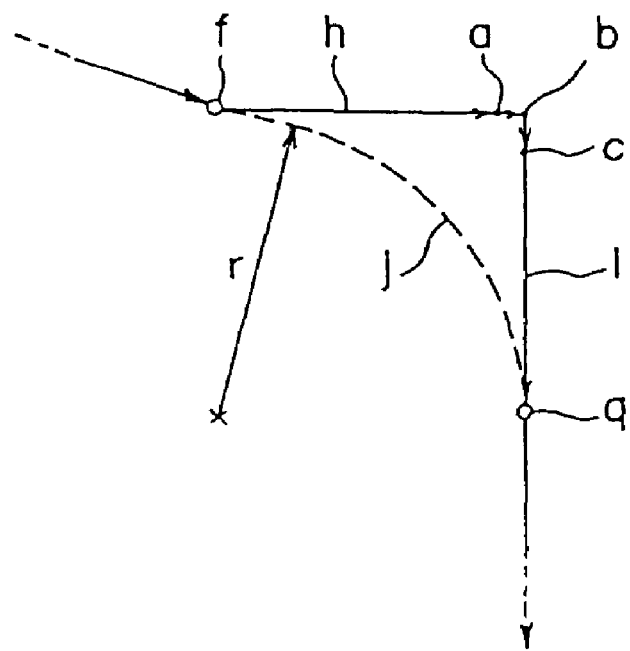

FIGS. 14 and 15 show a flow of the vectorization of irregular points (S106 at FIG. 8). First, the restoration recognition number (ID) of a block to be processed is determined (S161). Next, a characteristic point already vectorized is searched (S162), and characteristic points connected to the characteristic point are searched (S163). Then, it is decided if there are characteristic points within a predetermined short distance (YES at S164), irregular point flags are set for them because they have to be processed in the irregular point processing (S165). Next, if it is decided that one round of the contour has not yet been processed (S166), the flow returns to S163 for next characteristic point in the contour. Otherwise it is decided next if the processing on all the contours is completed or not (S167). If the decision is NO, a block consists of a plurality of contours and the flow returns to S162 for the next contour. If the processing on all the contours is completed, it is decided next if the processing on all the restoration distinction number is completed or not (S168). If it is decided that all the restoration distinction numbers (block IDs) are not processed (NO at S168), the flow returns to S161 for the processing of blocks of the next restoration distinction number. If it is decided that all the restoration distinction numbers are processed (YES at S168), the flow proceeds to S169 for the connection of contour at irregular points, as shown in examples in FIGS. 16(*a*) and 16(*b*).

In the connection processing of irregular points, first, the restoration distinction number (block ID) of a block to be processed is determined (S169). Next, a characteristic point (point "a" in FIG. 16(*a*)) which has not yet been connected is searched (S170). Further, it is decided if there are two other characteristic points not yet connected in the vicinity (S170). If the decision is NO, then the characteristic point is discarded as noise (S179) and the flow returns to S170. If there are decided to be two other characteristic points ("b" and "c" in FIG. 16(*a*)), these points are irregular points. Then, a characteristic point already connected is searched in a predetermined search direction within a predetermined distance (S172). If there are decided to be two connected points ("f" and "g" in FIG. 16(*a*)) (YES at S173), the irregular points are connected to the two points as a temporary contour ("h" and "i" in FIG. 16(*b*)) (S176). (The final restored contour is the dashed line "j" in FIG. 16(*b*).) Then it is decided if there is a characteristic point not yet connected (S177). If the decision is YES, the flow returns to S170 for the processing of the next irregular point. If there is decided no characteristic point not yet connected (NO at S177), it is decided if the processing on all the restoration distinction number is completed or not (S178). If the decision is NO, the flow returns to S169 for the processing of the next restoration distinction number. Otherwise the vectorization completes and the flow returns to the main flow (S180).

If it is decided that there is not two connected points (NO at S173), the search is performed by expanding the angle (S174), and it is decided again if there are two connected points (S175). If the decision is YES, the flow proceeds to S176 for the connection. Otherwise the characteristic points are discarded as noise (S179) and the flow returns to S170.

(b-5) Output

Figure 17:
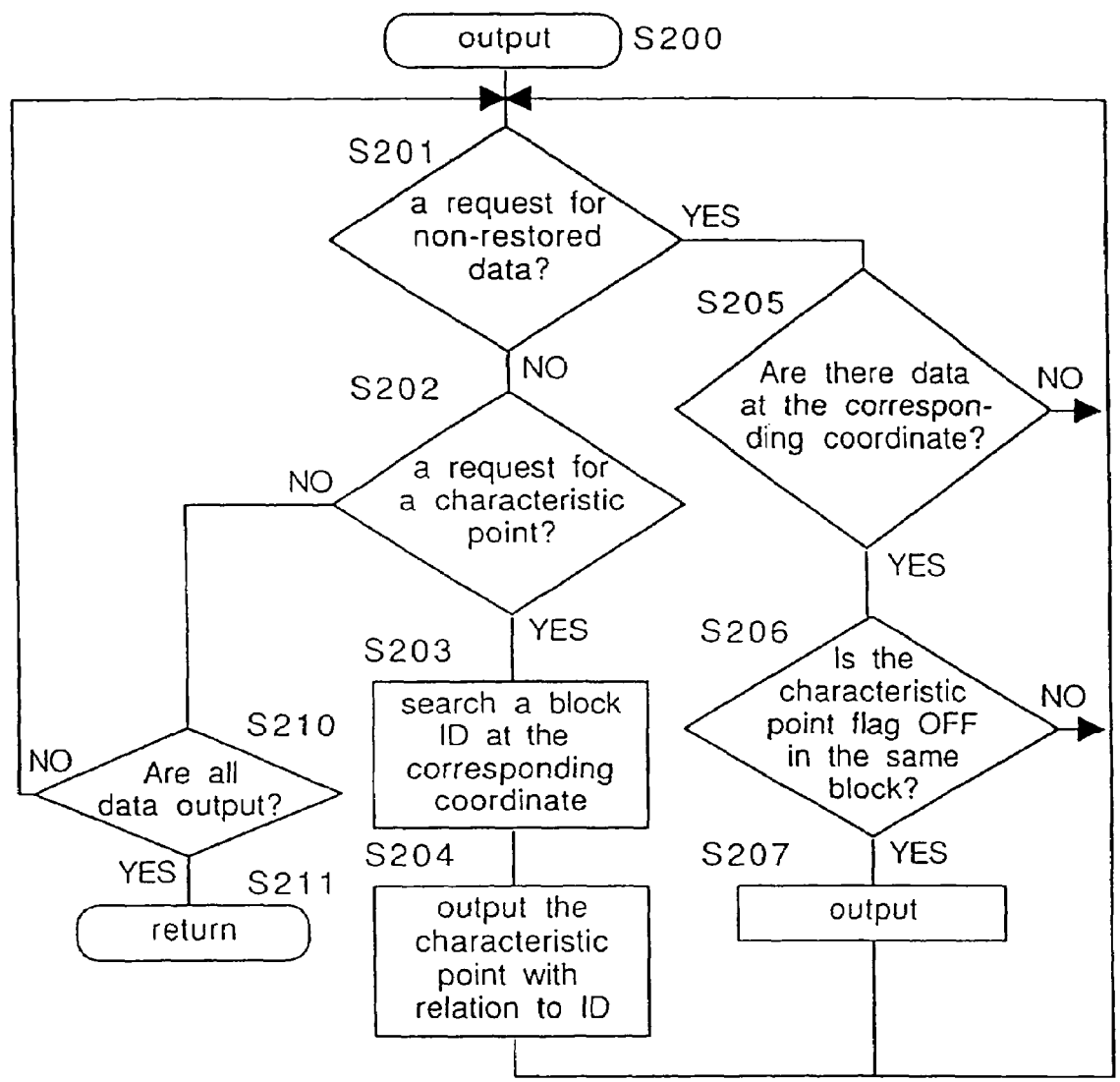
FIG. 17 is a flowchart of the output processing.

FIG. 17 shows a flow of the output processing (S106 in FIG. 8). First, it is decided on a line if there is a request for non-restored data (S201). If there is no request for non-restored data (NO at S201), it is decided if there is a request for a characteristic point on the line (S202). If there is a request for a characteristic point (YES at S202), the restoration distinction number (block ID) on the corresponding coordinate is searched (S203), and the data on the characteristic point with relation to the restoration distinction number is outputted (S204). Then the flow returns to S201. If there is decided to be no request for a characteristic point at S202, it is decided next if all data is outputted or not (S210). If there remains data not processed (NO at S210), the flow returns to S201 for the next processing.

If it is decided that there is a request for non-restored data (YES at S201), the data is outputted only if there are data at the corresponding coordinate (YES at S205) and no characteristic flag is set in the same block (YES at S206). Then the flow returns to S201 for the next processing. In a second embodiment explained later, the original data and the block information are outputted when the data is sent to the characteristic point generator 22.

(c) Image Restoration

In the image restoration section 13, a plurality of vectorized contours are developed, and the contours are subjected to raster scan for painting at a predetermined density between an odd-numbered characteristic point and an even-numbered characteristic point. The paint density is the average density of the block which includes the relevant characteristic points.

An example of the rules for expressing a contour is described below (refer to FIGS. 18(a)-18(d)).

(1) A straight line is longer than a predetermined length and has a starting point and a last point, each consisting of two characteristic points arranged within a short distance (four characteristic points).

(2) An arc of short distance is approximated as a short straight line. If the characteristic points are arranged within a short distance, the number of the points are chosen except three in order to prevent processing as irregular points.

(3) A long curve is approximated by an arc which goes through a starting point, a middle point and a last point apart a distance more than a predetermined length. The middle point is located just in the middle of the starting and last points, and each point consists of a single characteristic point.

(4) An irregular point consists of three characteristic points arranged within a predetermined short distance, and the deformation method is determined with relation to characteristic points in the forward and backward directions.

(5) The other points are regarded as a straight line.

(6) A curve includes at least one straight line.

Figure 19:
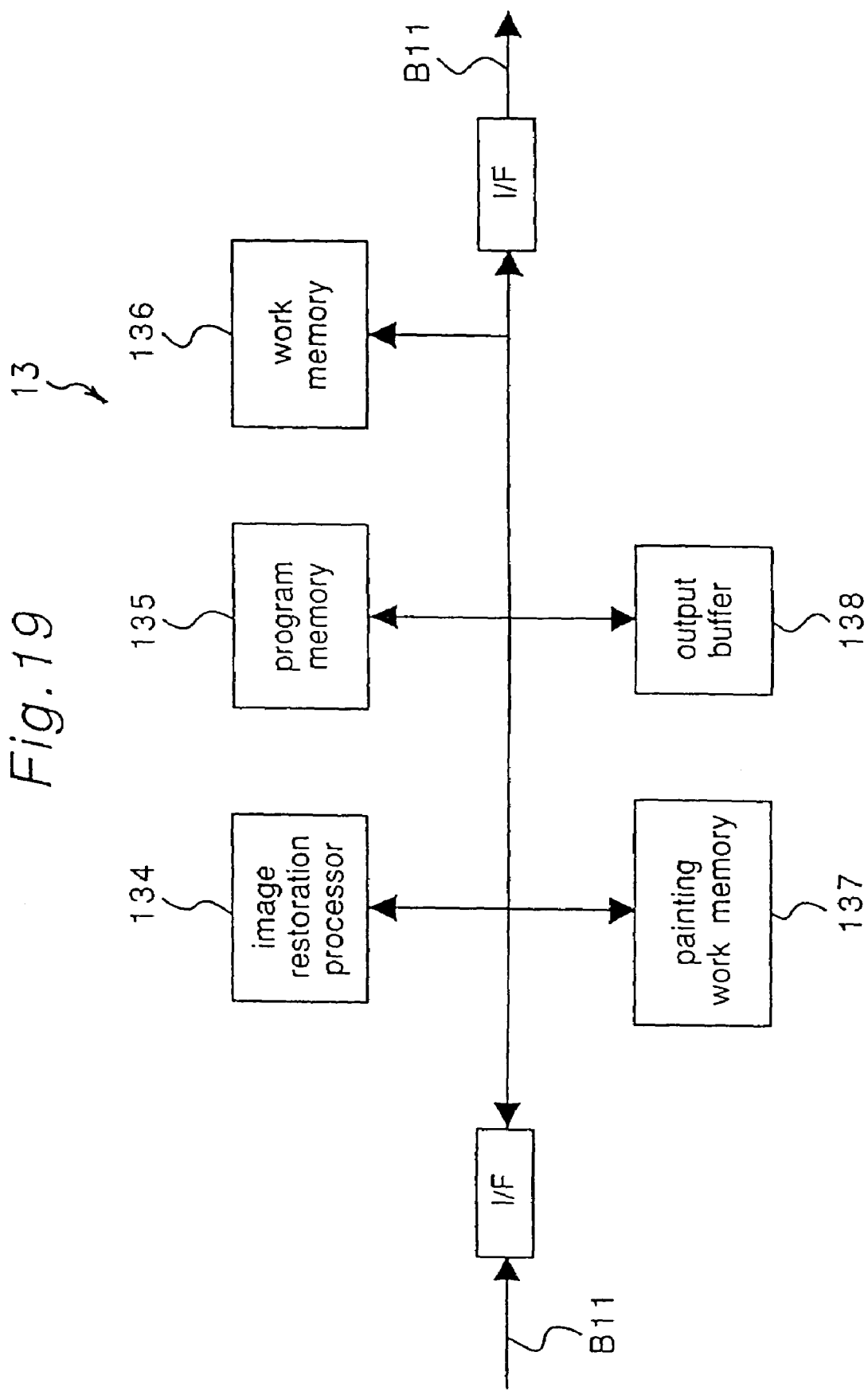
FIG. 19 is a block diagram of an image restoration section.

FIG. 19 shows a block diagram of the image restoration section 13. A program memory 135 stores a program executed by an image restoration processor 134. This processor 134 executes the program to receive characteristic points via a bus B1 when a request of restored data is received via a bus B11, performs restoration for each block in the painting work memory 137, develops the image in an output buffer 138 and sends the restored image via the bus B11.

Figure 20:
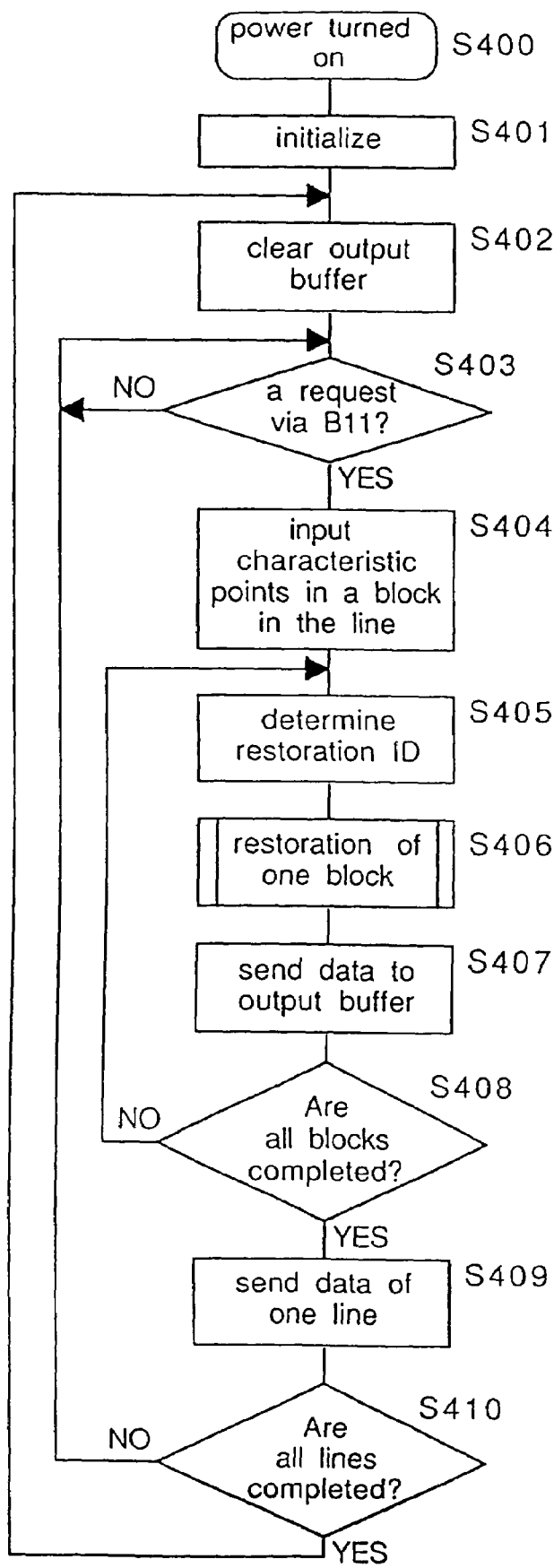
FIG. 20 is a flowchart of image restoration.

FIG. 20 shows a flow of image restoration executed by the image restoration processor 134. When the electric power is turned ON, the initialization is performed first (S401), and the output buffer 138 is cleared (S402). Next, if a restoration request is received via the bus B11 (S403), the characteristic points of a block which starts in the relevant line are inputted (S404). Then, a restoration distinction number (block ID) is determined (S405), the one block is restored (S406, refer to FIG. 21) and the data are sent to the output buffer 138 (S407). Next, if the image restoration on all the blocks is decided not to be completed (NO at S408), the flow returns to S405 for the next block. If all the blocks are processed (YES at S408), the data of the line are outputted (S409). Next, if the processing on all the lines is decided not to be completed (NO at S410), the flow returns to S403 for the processing on the next line. If the processing on all the lines is decided to be completed (YES at S410), the flow returns to S402 for the processing of the next image restoration.

Figure 18A:
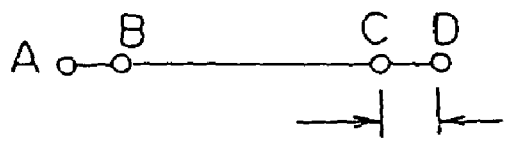
FIGS. 18(a)-18(d) are diagrams for explaining rules for expressing a contour.
Figure 18B:
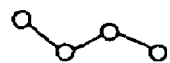
Figure 18C:
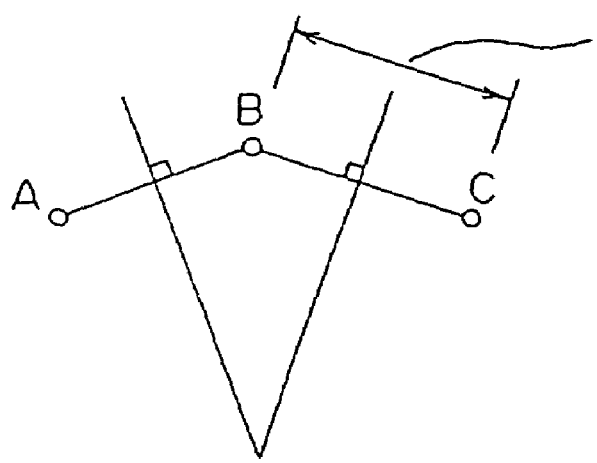
Figure 18D:
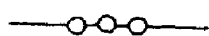
Figure 21:
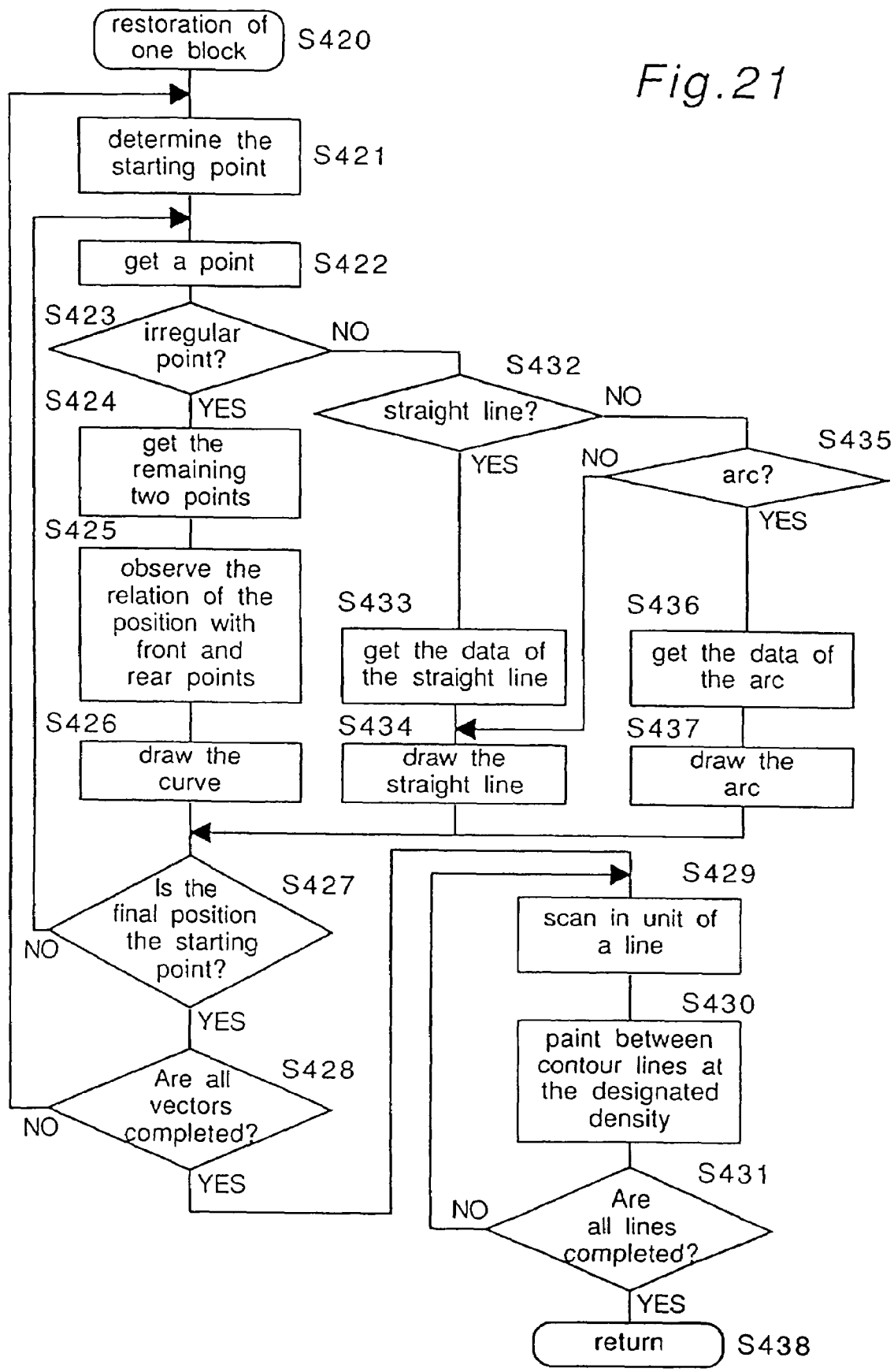
FIG. 21 is a flowchart of the restoration of one block.

FIG. 21 shows a flow of one block restoration (S406 in FIG. 20). First, a starting point is determined in a contour by searching for a straight portion (S421). The straight portion is decided as shown in FIG. 18(a). That is, an irregular point can be distinguished by the existence of three characteristic points within a predetermined short distance. A straight line is distinguished by characteristic points of a number except three arranged almost linearly and connected to another set of characteristic points with a long straight line. An arc of short distance is distinguished by expressing it as a short straight line. Further, when a center on three characteristic points A, B and C is defined as a point at which a normal of a straight line between characteristic points A and B crosses another normal of a straight line between characteristic points B and C, an arc can be distinguished when the distances from the center to the three characteristic points are within a predetermined error (refer to FIG. 18(d)).

Next, a characteristic point is selected in the contour (S422). If the characteristic point is decided to belong to an irregular point (YES at S423), the other two characteristic points are taken out (S424) and the position relation of the irregular point with front and rear characteristic points in the forward and backward directions is checked (S425), and the deformed curve is drawn in the work memory 136 (S426). If a characteristic point is decided to be a straight line (YES at S432), the data on the straight portion is taken out (S433) and the straight line is drawn in the work memory 136 (S434). If a characteristic point is decided to be an arc (YES at S435), the data on the arc portion is taken out (S437) and the arc is drawn in the work memory 136. If the characteristic point is decided not to be any of irregular points, a straight line and an arc (NO at S435), the flow proceeds to S434, and a straight line is drawn in the work memory 136.

Next, if the last point is decided not to be a starting point (NO at S427), the flow returns to S422 to process the next point. If the last point is decided to agree with a starting point (YES at S427), the processing of the contour completes. Then, if the processing on all the contours (vectors) is decided not to be completed (NO at S428), the flow returns to S421 to restore the next contour.

If the processing on all the contours is decided to be completed (YES at S428), the scanning is performed in unit of line (S429) and the painting is performed between contour lines at a designated density in the paint work memory 137 (S439). This painting is continued until all lines are processed (YES at S431).

(d) Addition of Characteristic Points

Figure 22:
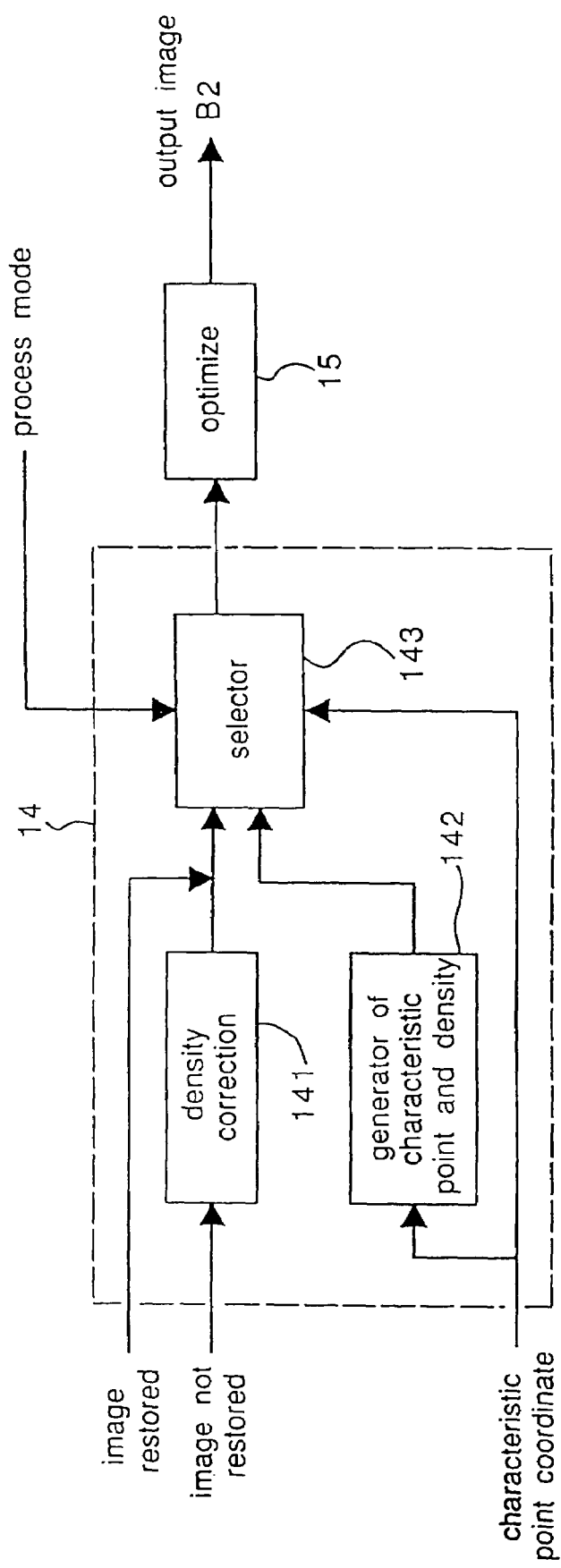
FIG. 22 is a block diagram of a characteristic point adder.

FIG. 22 shows the structure of the characteristic point adder 14 wherein a characteristic coordinate is received and the data of a predetermined density is added to the coordinate. A density correction section is not used in this embodiment 141. The density of an image having the same density as characteristic points is shifted in order to prevent the confusion with the characteristic points. A selector 143 selects not the image information, but the density data of a characteristic point when a characteristic point coordinate "b" is received. Thus, the image data and the characteristic point data are synthesized. If the process mode is set in the operational section 16, the addition of characteristic points is prohibited in the selector 143.

As explained above, if an editor mode is set by the operational section 16, the editor 12 edits the extracted characteristic point data and the image data in the non-restorable regions not including characteristic points independently for rotation, enlargement or the like. Then, the edited data are synthesized in the above-mentioned characteristic point adder 14.

C. Second Embodiment (e) Generation and Addition of Characteristic Points when a Hard Copy is Obtained As to a document which includes characteristic points as explained above, the degradation of image can be suppressed on repeated copy generation. On the contrary, an ordinary document without characteristic points and a document including an ordinary image without characteristic points patched in part may be degraded due to copying. Then, in this embodiment, characteristic points can be added to such a document when a hard copy is obtained in order to prevent the image degradation in a copying thereafter.

In some cases, two kinds of images with and without characteristic points are mixed in a document. For such a document, image regions with characteristic points and those without characteristic points are distinguished, and image data restored by using the characteristic points and image data in the regions without characteristic points are synthesized. Further, the characteristic points and the image data in the regions without characteristic points can be edited independently for rotation or the like.

Figure 23:
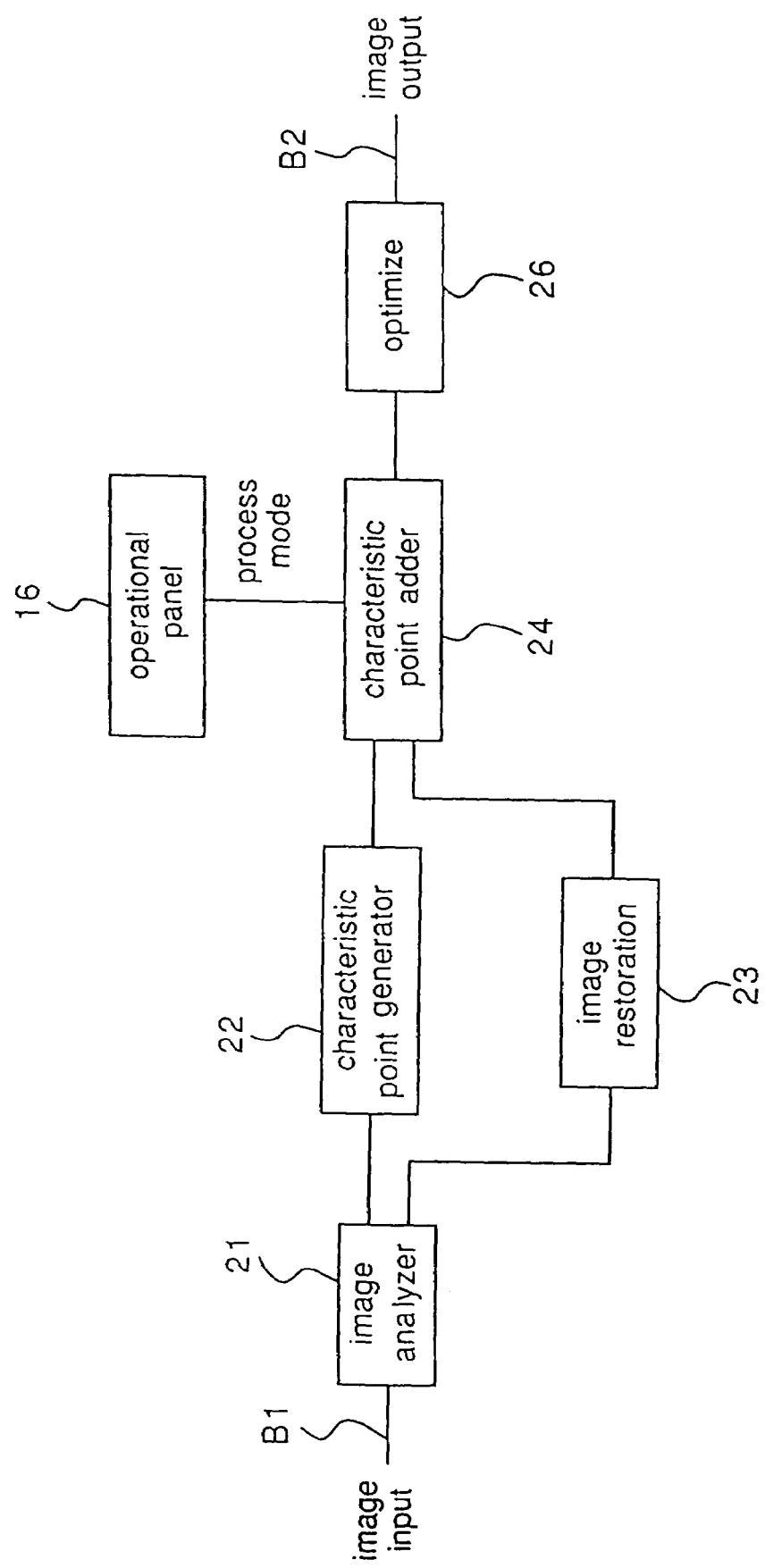
FIG. 23 is a block diagram of an image processor of a digital copying machine.

FIG. 23 displays a block diagram of an image processor of a digital copying machine which can add characteristic points wherein characteristic points are extracted and regions are distinguished by an image analyzer 21 as to digital image data received via the bus B1 from an image reader or the like. That is, characteristic points are extracted from the input image data and regions are distinguished from the characteristic points or restorable regions with characteristic points and non-restorable regions without characteristic points. In the non-restorable regions, the as-received image data are used in the following processing, while characteristic points are generated from the image data in the characteristic point generator 22. In the restorable regions, the as-received image data are not used, and image data are restored in the image restoration section 23 from the extracted characteristic points. These image data are synthesized and the generated characteristic points are added thereto in the characteristic point adder 24. If the density of characteristic points can be selected among a plurality of densities, the density closest to the density around the characteristic point is selected. Further, the characteristic points cannot be added in the output image data in a process mode set with the operational section 25. Finally, in the optimization section 26, the image density can be corrected with smoothing or the like according to a process mode designated with the operational section 25.

Figure 24A:
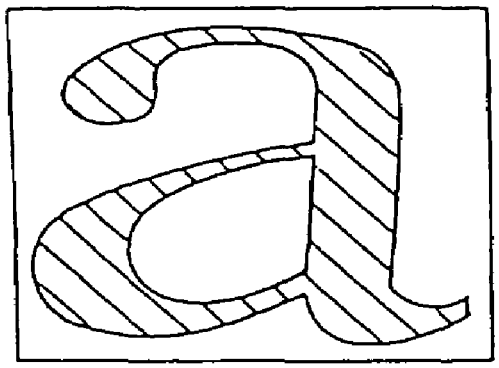
FIGS. 24(a), 24(b), 24(c) and 24(d) are diagrams for illustrating the generation of characteristic points.
Figure 24B:
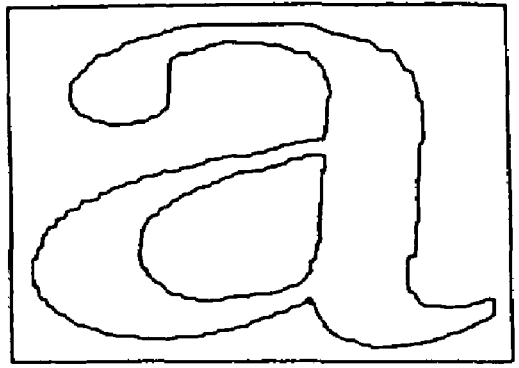
Figure 24D:
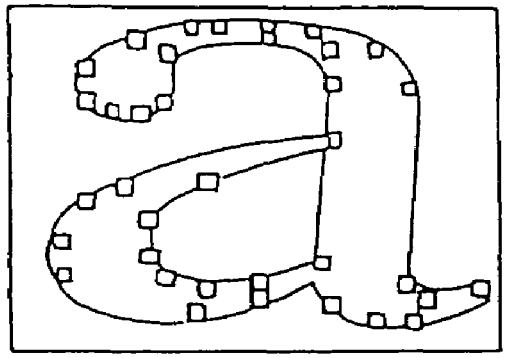
Figure 24C:
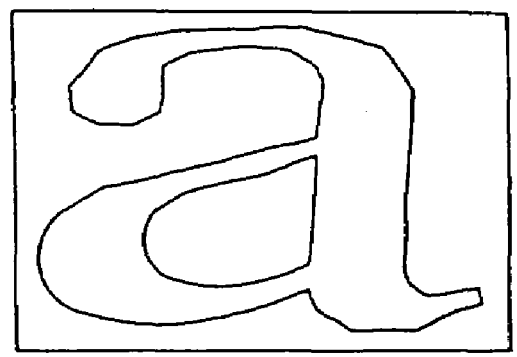

FIGS. 24(a)-24(d) illustrate how characteristic points are generated. As to as-received image data in a non-restorable region shown in FIG. 24(a), contours are extracted first as shown in FIG. 24(b). If the pattern of the contour is simple, characteristic points can be obtained readily from the contour. On the other hand, in case of a character or the like, smoothing of the data is performed in order to remove noises on reading and the contour is approximated with straight lines as shown in FIG. 24(c). Then, the crosses of straight lines located within the pattern are regarded as the coordinates of characteristic points as shown in FIG. 24(d).

Figure 25:
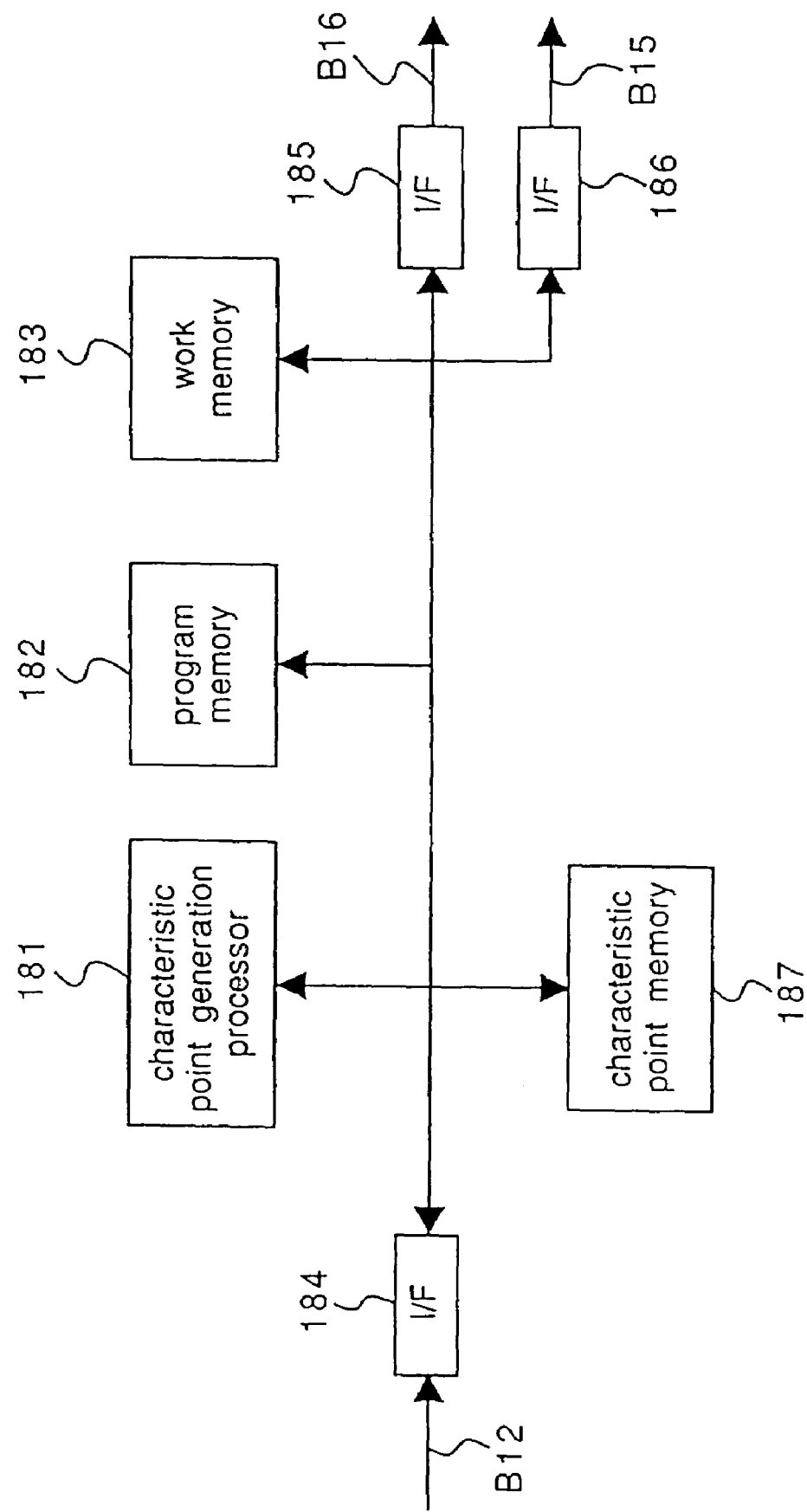
FIG. 25 is a block diagram of characteristic point generator.

FIG. 25 shows a block diagram of the characteristic point generator 22. A characteristic point generation processor 181 starts processing according to a request received via interfaces 184, 185 and 186 from buses B12, B15 and B16, receives non-restored information (information on blocks without characteristic points) through the interface 184 from the bus B12, and generates characteristic points on the non-restored information to send to the characteristic point memory 187. The information of the generated characteristic points is sent to the bus B15 while the original image is sent to the bus B16. The data structure of the characteristic point memory 187 is the same as in case of the image analysis processor 123 (refer to (b-2)).

The contents of the processing (FIGS. 26-29) of the characteristic point generation processor 181 are as follows:

(1) The information on a block from a required line is received.

(2) A contour is approximated by resembling it as an arc or a straight line.

(3) A contour which may shorten the restoration time with use of irregular processing is searched, and the contour is deformed if any.

(4) If the processing of a line completes, the characteristic points are sent from the characteristic point memory 187 to the bus B15, and receives the original image (the content of the image memory 111) from the bus B11 to send it to the bus B16.

Figure 26:
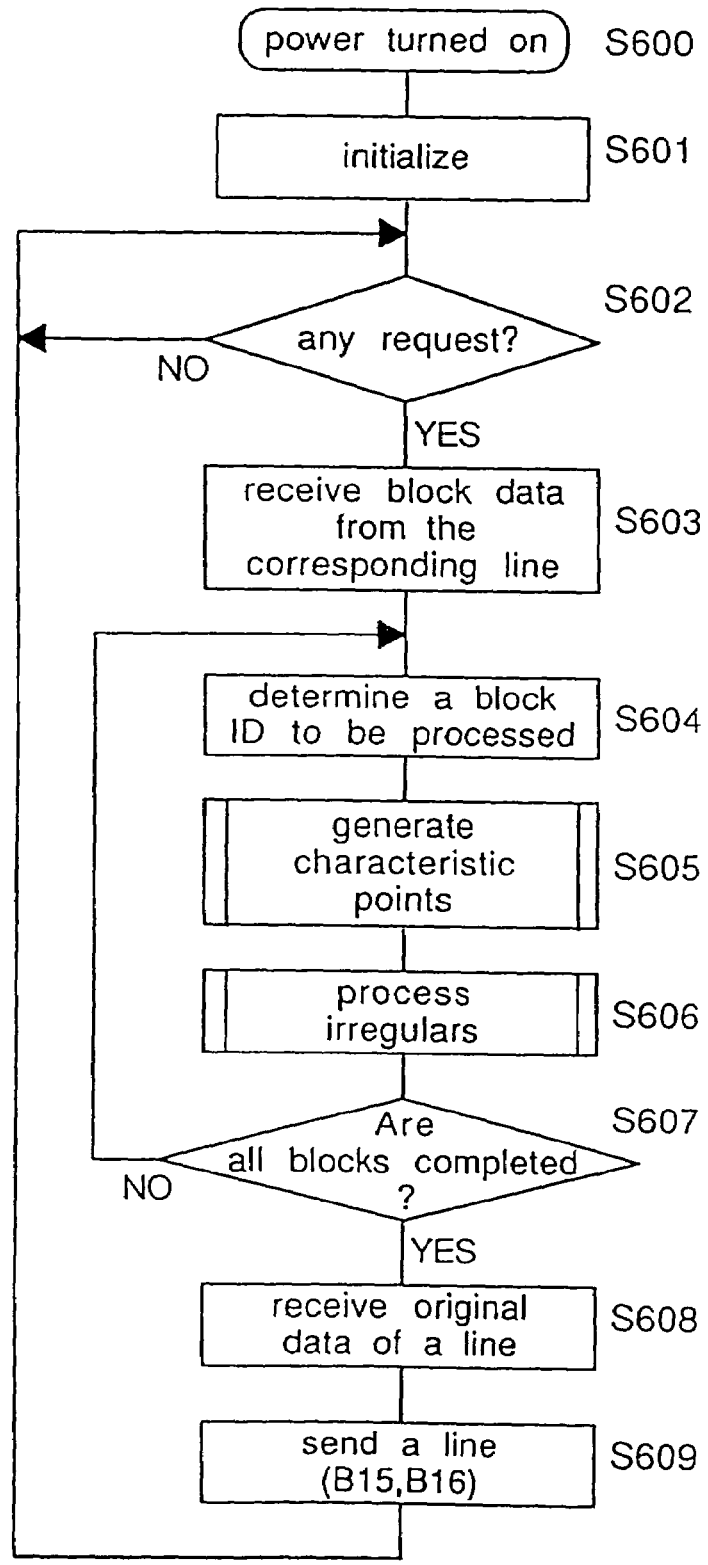
FIG. 26 is a flowchart of the processing of the characteristic point generation processor.

FIG. 26 shows a flow of the control of the characteristic point generation processor 181. After the initialization (S601), a request of characteristic point generation is awaited (S602).

If the request is received (YES at S602), the data of blocks in the relevant line are received (S603). Then, a restoration distinction number (block ID) to be processed is determined (S604), and the characteristic point generation (S605, refer to FIG. 27) and the irregular processing (S606, refer to FIG. 29) are performed. These processings are performed on all blocks (S607). Then, the original data of the line is received (S607) and the one line data are outputted via the buses B15 and B16 (S609). Then, the flow returns to S602 for the next request.

Figure 27:
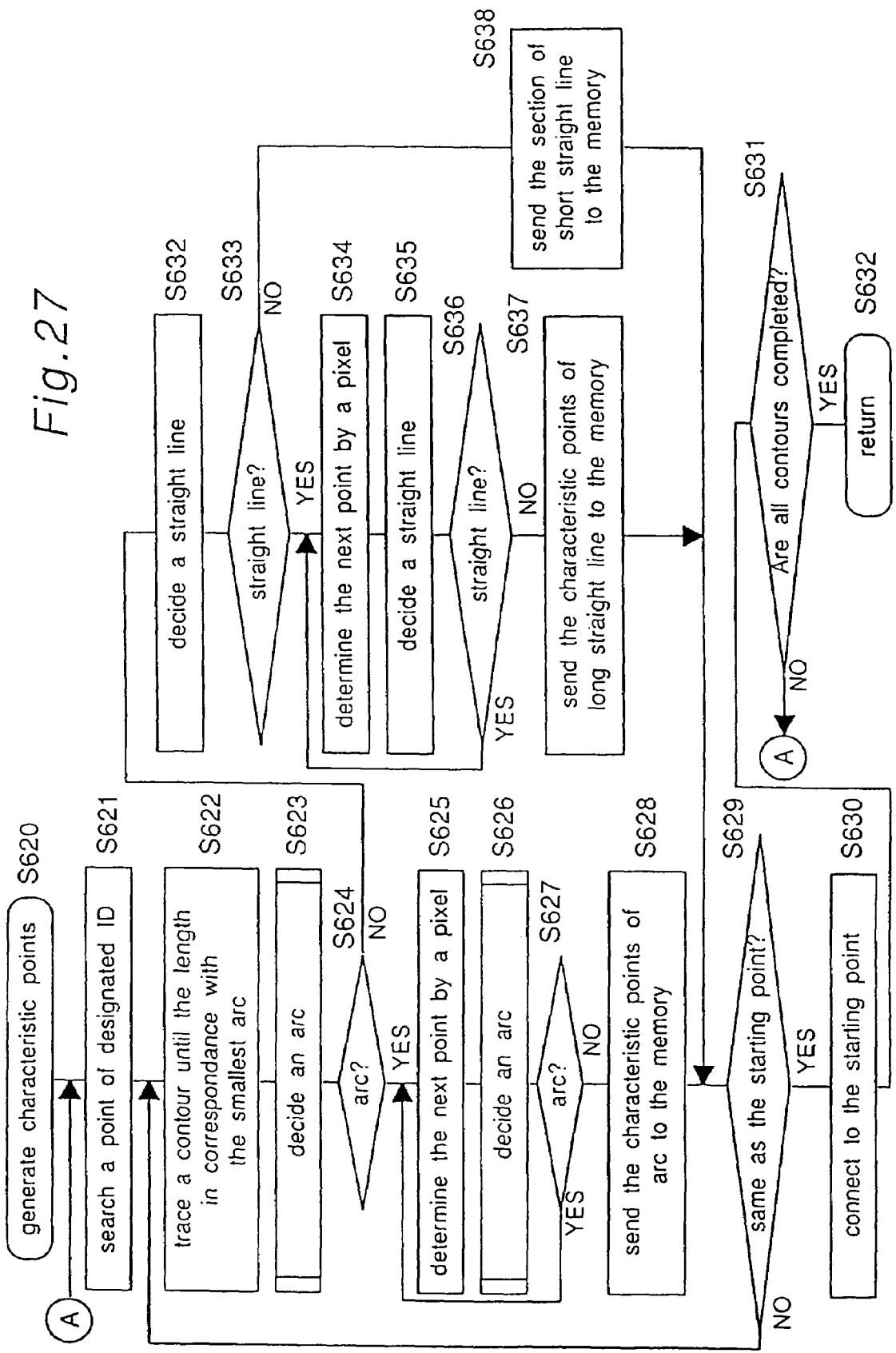
FIG. 27 is a flowchart of characteristic point generation.

FIG. 27 shows a flow of characteristic point generation (S605 in FIG. 26). First, a characteristic point in the designated restoration distinction number (block ID) is searched (S621), and a contour is resembled up to a length in correspondence to the smallest arc (S622). That is, the contour is traced by calculating the distance on the basis of the block information. Next, an arc decision is performed to decide if the portion is an arc or not (S623). If it is decided to be an arc (YES at S624), a characteristic point next by one pixel is determined (S625), and the arc decision is performed again (S626). If it is decided to be an arc (YES at S627), the flow returns to S625 for the arc decision of the next characteristic point. Otherwise, the data on the characteristic points of the arcs obtained above are sent to the characteristic point memory 187 (S628).

If it is decided not to be an arc (NO at S624), a straight line decision is performed with use of the least square method (S632). If it is decided to be a straight line (YES at S633), a characteristic point next by one pixel is determined (S634), and the straight line decision is performed again (S635). If it is decided to be a straight line (YES at S636), the flow returns to S634 for the straight line decision of the next characteristic point. Otherwise, the data on the characteristic points of the long straight lines obtained above are sent to the characteristic point memory 187 (S637).

If it is decided to be neither an arc nor a straight line (NO at S633), data on the section as a short straight line are sent to the characteristic point memory 187 (S638).

The above-mentioned decision is continued until the next characteristic point agrees with the starting point (YES at S629). Then, the last characteristic point is connected to the starting one (S630), to complete a contour. The above-mentioned processing is continued until all contours are completed (YES at S631).

Figure 28:
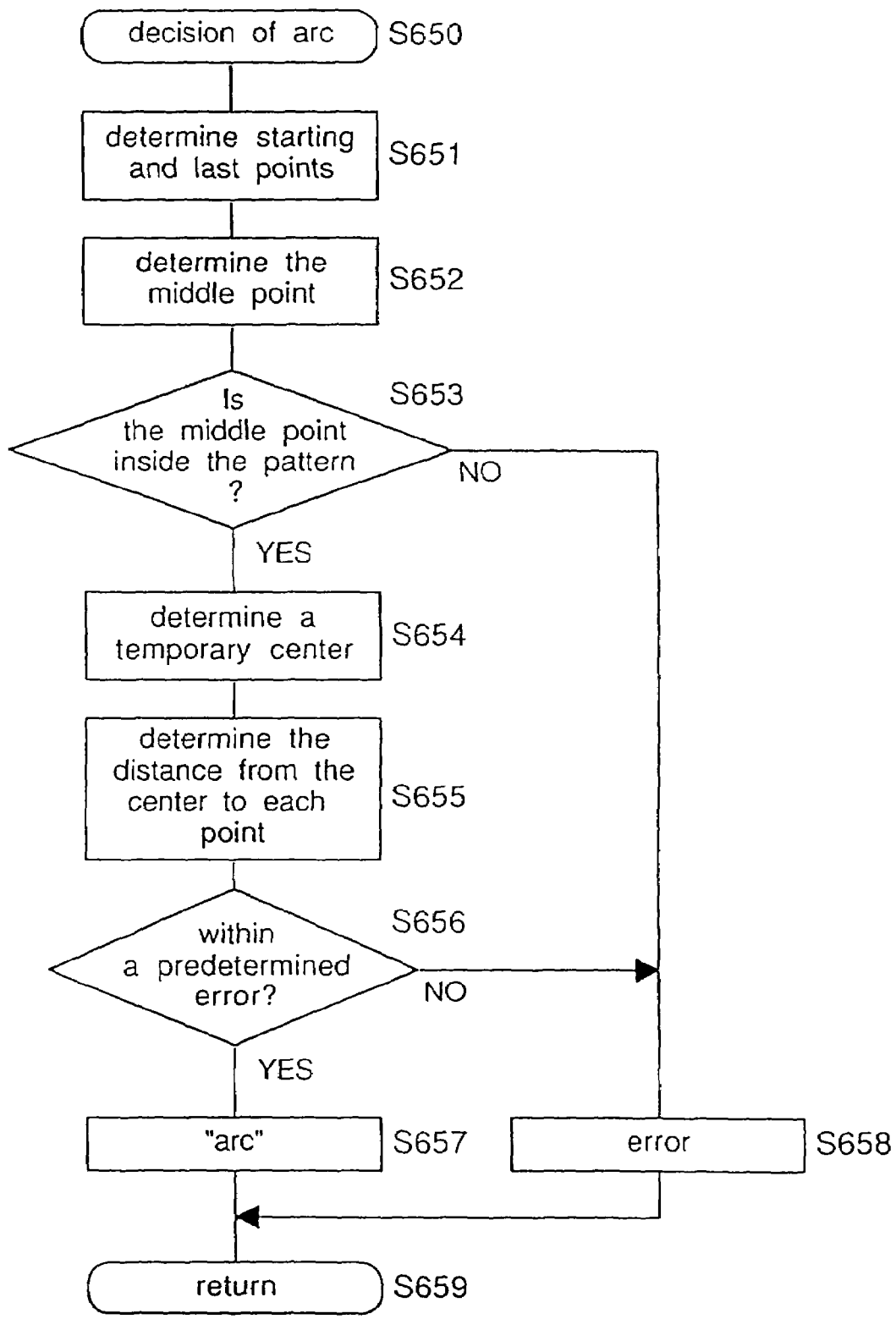
FIG. 28 is a flowchart of arc decision.

FIG. 28 shows a flow of the arc decision (S623 and S626 in FIG. 27). First, starting and last points are determined (S651), and the middle point thereof is determined (S652). If necessary, noises are removed. Next, it is decided if the middle point is inside the pattern (S653). If the decision is NO, it is an error (S658), and the data are neglected. If the decision is YES, a temporary center is determined (S654) and the distances from the center to each point is determined (S655). If the distances are determined within a predetermined error (YES at S656), it is decided to be an arc (S657). Otherwise it is decided to be an error (S658).

Figure 29:
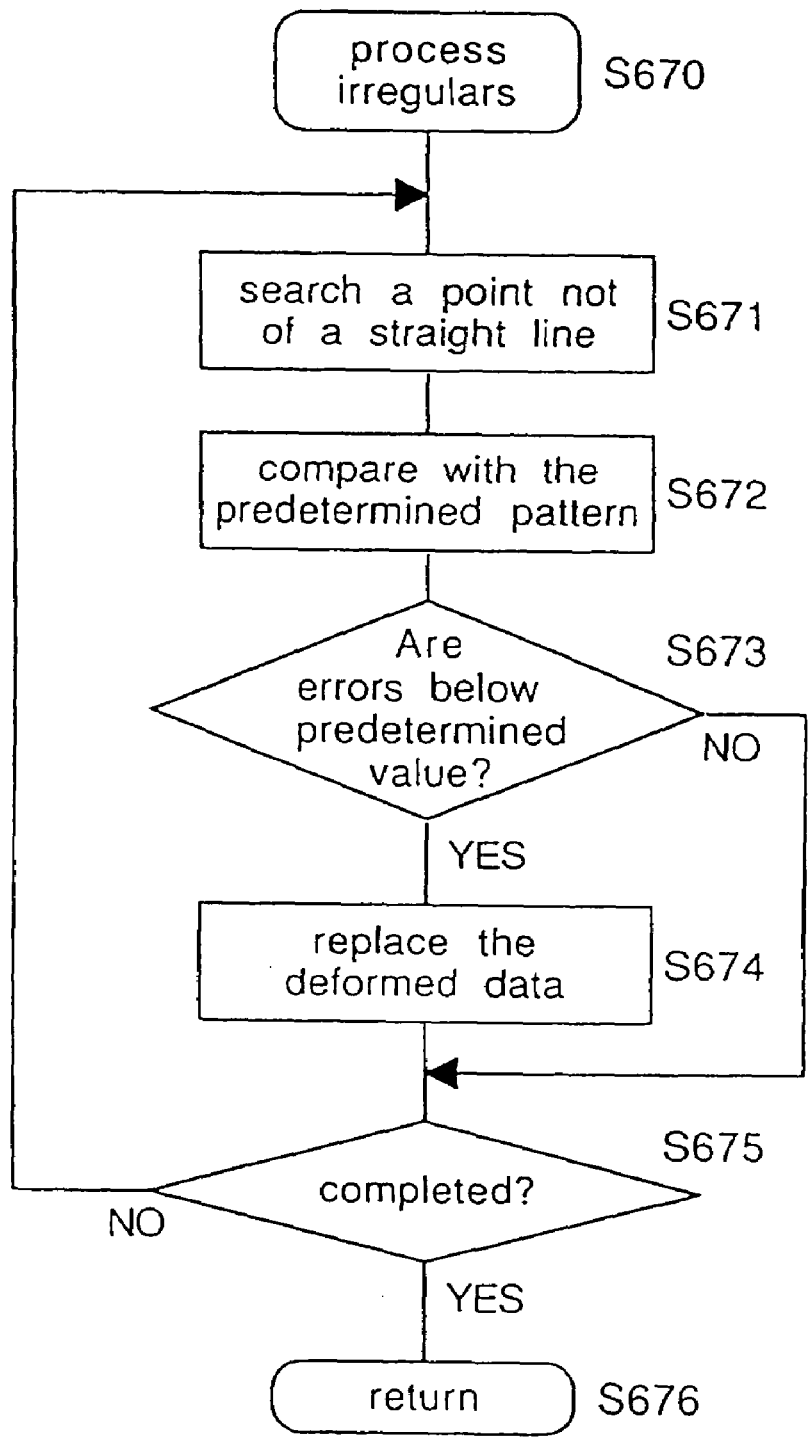
FIG. 29 is a flowchart of irregular processing.

FIG. 29 shows a flow of the irregular processing (S606 in FIG. 26). First points which do not belong to a straight line are searched (S671), and they are compared with a predetermined pattern (S672). If it is decided that the error is within a predetermined value (YES at S673), then they are replaced by deformed data (S674). This processing is continued until the last characteristic point is processed (YES at S675).

D. Third Embodiment

(f) Standard Pattern of Density

With respect to the characteristic points as explained above, the density level of an image is important, and it is a problem to be solved how to read the density correctly. As a technique to normalize the density, a standard pattern is read, and the input data can be corrected according to the density change of the standard pattern, as is used for automatic exposure of a copying machine.

Figure 30:
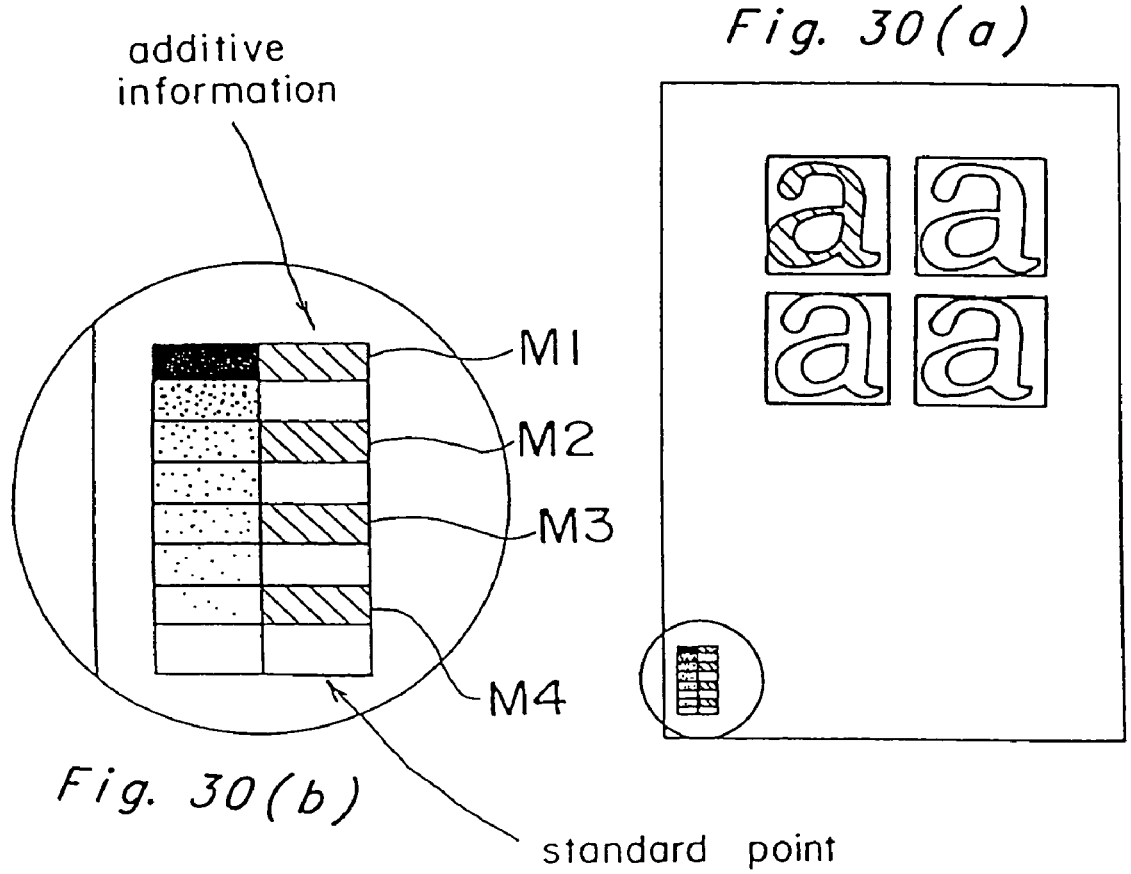
FIGS. 30(a) and 30(b) are diagrams of an example of a layout of a density standard pattern provided on a document.

Such a standard pattern can be printed beforehand in a document at an appropriate position. FIG. 30(a) shows an example of a layout of such a document. A standard pattern is printed at a lowermost left corner of the document. The standard pattern, englarged in FIG. 30(b), includes marks of different densities (left) and the density used for the characteristic points (right).

The standard pattern may be read before the read of the document, as in the automatic exposure. A whole document including the standard pattern may also be read at the same time, and the data on the standard pattern may be taken out.

Figure 31:
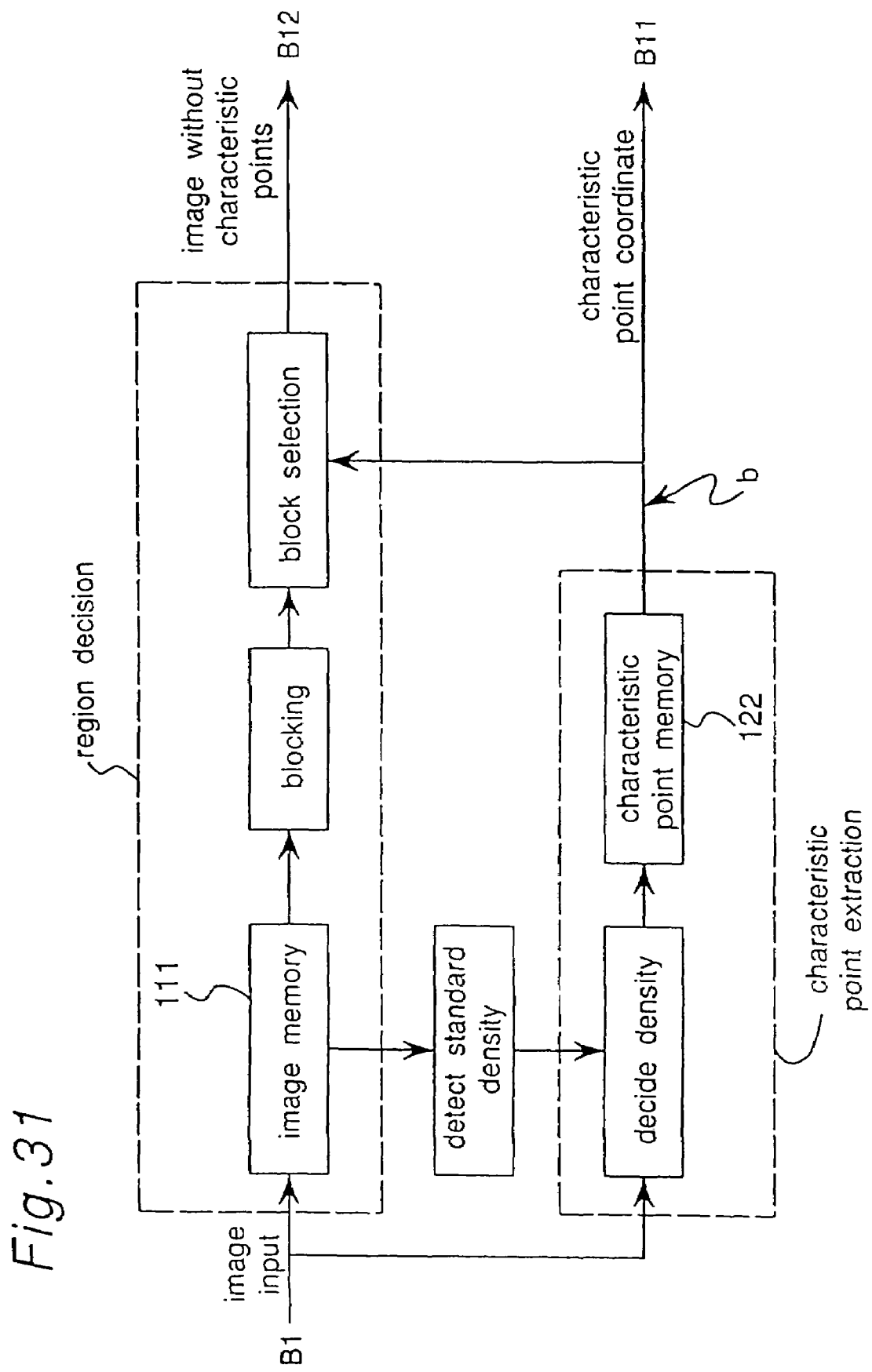
FIG. 31 is diagram of a flow for reading the density standard pattern.

FIG. 31 shows a flow in the latter case when the data on the standard pattern is taken out from the data of the whole document. The image analysis processor 11 shown in FIG. 7 performs the extraction of characteristic points and region distinction. However, in this embodiment, it performs the detection of the standard density before the extraction of characteristic points. Then, in the extraction of characteristic points, the data received from the image memory 111 are compared with the standard density, and the data which agrees with the predetermined standard density are decided to be characteristic points. In the read of the standard density, if a plurality of density levels are set for characteristic points, as in the document of FIG. 30, the plural density levels are used for the decision of characteristic points.

(g) Addition of Characteristic Points at Low Densities for a Half-tone Image For a half-tone image, characteristic points have to be added so as to minimize the effect on the image largely. If characteristic point of high density are added, they may become noises in the image. Therefore, in the present embodiment, a plurality of densities selected in the whole density distribution of the image is used for expressing characteristic points. In this method, a plurality of density bands is used for characteristic points, and they have the densities at the center of the density bands. One of the central densities which is closest to the density around a characteristic point is assigned to the characteristic points. Thus, characteristic points may be added with a low density even for a document including an area of low density so as to minimize the effect on the image.

In an example shown in FIG. 32(a), four densities of $I_n$ (n=1, 2, 3 and 4) are used for characteristic points, and the three densities of $I_n$ (n=2, 3 and 4) are within the density region for the image. The as-received image data except the densities $I_n$ for characteristic points are used as image data without processing. FIG. 32(b) shows a situation around the density $I_2$ for a characteristic point. When a hard copy is generated, characteristic points are written at the predetermined densities $I_n$. However, the density on the hard copy may scatter due to the quality of hard-copy and the read precision. Then, the scattering width is set as Wa, and the image within the range is regarded as characteristic points. Further, the reading of image data also scatters. Therefore, the image data in the width Wb at both sides of the scattering width Wa are regarded as the same level $D_n$.

(h) Extraction of Characteristic Points for Continuous Density Change

When a plurality of density bands are assigned to characteristic points in the density range for image, the decrease in dynamic range is a problem. That is, because the density range which can be expressed on a hard copy is limited, when a part thereof is assigned to characteristic points, the range available for an image decreases.

Further, characteristic points may become image noise. A multi-level half-tone document includes an image wherein the density changes continuously (FIG. 33(a)). In this case, because the densities assigned for the characteristic points cannot be used, linear noises may happen around the densities. On the other hand, a half-tone image includes an image consisting of areas each of constant density (FIG. 33(b)). In the latter case, the change on image can be avoided by shifting the density a little for the image density around the densities assigned for the characteristic points. In concrete, the density correction section 14 in characteristic point adder 14 in FIG. 22 shifts the density as mentioned above in order to prevent confusion with characteristic points of the same density.

The two kinds of images can be distinguished as explained below. For a characteristic point of density $I_1$ located at a position $P_1$, as shown in FIGS. 34(*a*) and (*b*), the decision is preferably performed both in the vertical and horizontal directions. When the density is read along a direction, if the data changes continuously around $I_1$, the data is regarded not as a characteristic point, but as an image data. On the other hand, if the data changes discontinuously around $I_1$, the data are regarded as a characteristic point.

The density change is detected similarly as in the blocking wherein the image density change is detected in a direction, and if the image is decided to change continuously at around the density assigned for characteristic points, a characteristic point of a density different from the image density is added. Otherwise a characteristic point of the assigned density is added. When a hard copy is read, if the density in a direction is decided to change continuously around the density assigned for characteristic points, the data are decided not to be on a characteristic point and is regarded as a part of the image. Otherwise if the density in a direction is decided to change discontinuously around the density assigned for characteristic points, the data are decided to be on a characteristic point.

(i) Addition of Characteristic Points for a Half-tone Image with Continuous Density Change As explained above, in principle, predetermined density bands are assigned to characteristic points. As shown in FIG. 34(*a*), if the image density changes gradually, all bands are assigned to the image. When the image density changes gradually, it is not needed to get a contour line in such a region wherein the density changes continuously, and there is no problem. On the other hand, if the density for characteristic points is assigned in the document density region for an image wherein the density changed continuously, noises may arise. In the present invention, in order to suppress noises, the sensitivity region for image data is assigned linearly in the document density region. Further, in such an image as shown in FIG. 34(*b*) wherein the density changes discontinuously, the sensitivity region is changed partly as shown in detail in FIG. 35(*b*), in order to express all the data without the density band Wa assigned for characteristic points. That is, the slope of density bands Wb' adjacent to the density band Wa is changed to assign the document density in the density band Wa outside the density band. The width of the density band for changing the band may be expanded to another density band for characteristic points.

FIG. 36 shows a structure of the image processor for distinguishing characteristic points from image data. The blocking 112 in the region distinction processing differs from the processing in the image analysis processor 123 explained above. Not only separated patterns, but also images of density difference larger than a predetermined level are regarded as blocks, and region decision 113 is performed for the blocks. As to the images without characteristic points, the density data around the density assigned for characteristic points are changed in the density correction section 114 so that the image density changes continuously. That is, the data within the width Wb in FIG. 35(*b*) are transformed to data in the ranges of Wa and Wb.

Figure 37:
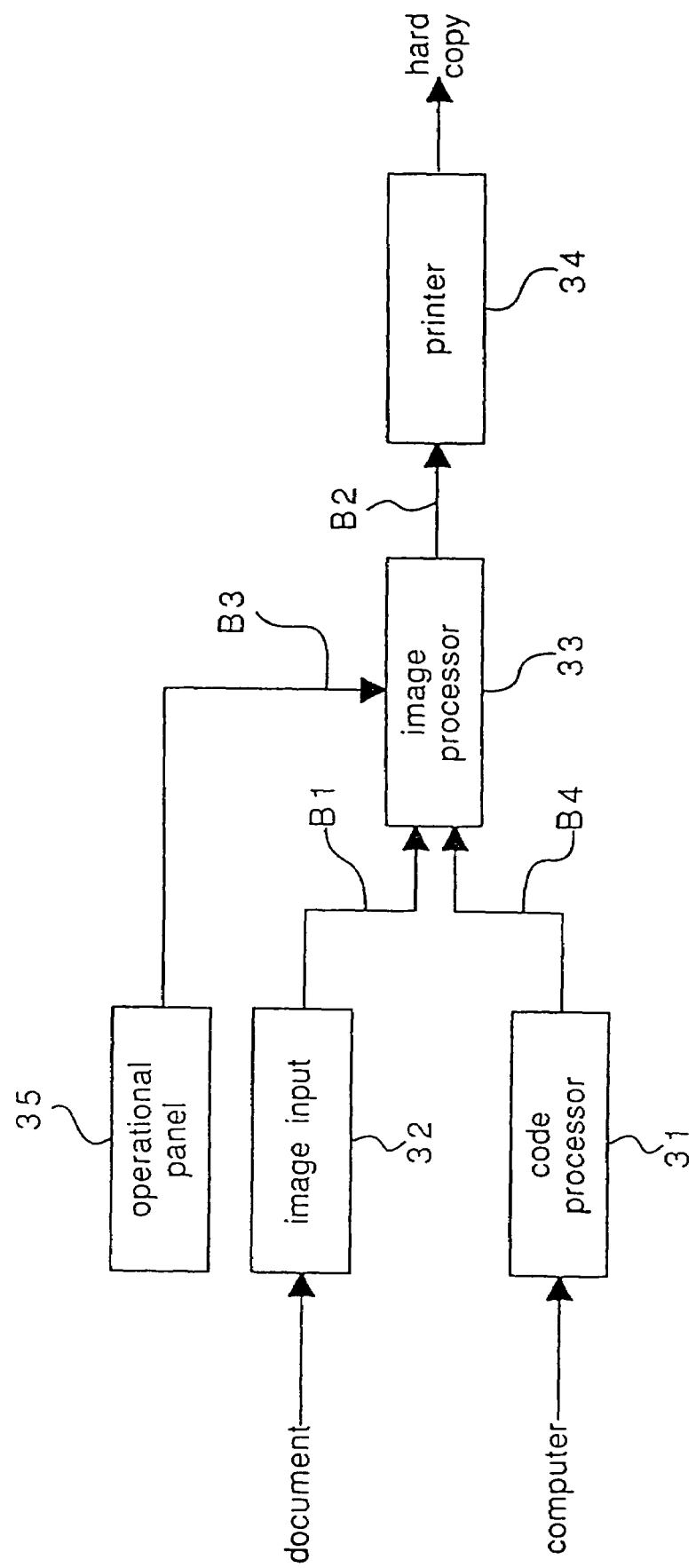
FIG. 37 is a block diagram of the addition of characteristic points when an original document is prepared.

E. Fourth Embodiment (j) Addition of Characteristic Points to an Original Document It is desirable that characteristic points are added to an original document. FIG. 37 shows a structure of a digital copying machine equipped with a printer function. The copying machine can add characteristic points when an original document is prepared by using a computer and the like with an outline font. The code information of outline font is received from the computer by a code processor 31 to generate image data. The image data are sent to an image processor 33 and printed by a printer section 34. On the other hand, when characteristic points are added to the original document, the image data read from the document are received by an image input section 32 and sent to the image processor 33. On the other hand, the code processor 31 calculates characteristic points from the outline font data of the code information, and the data on the characteristic points are sent to the image processor 33. By setting a process mode with an operational panel 35, the characteristic points are added in the image processor 33. The data including the characteristic are printed in the printer section 34 on a paper as a hard copy.

Figure 38:
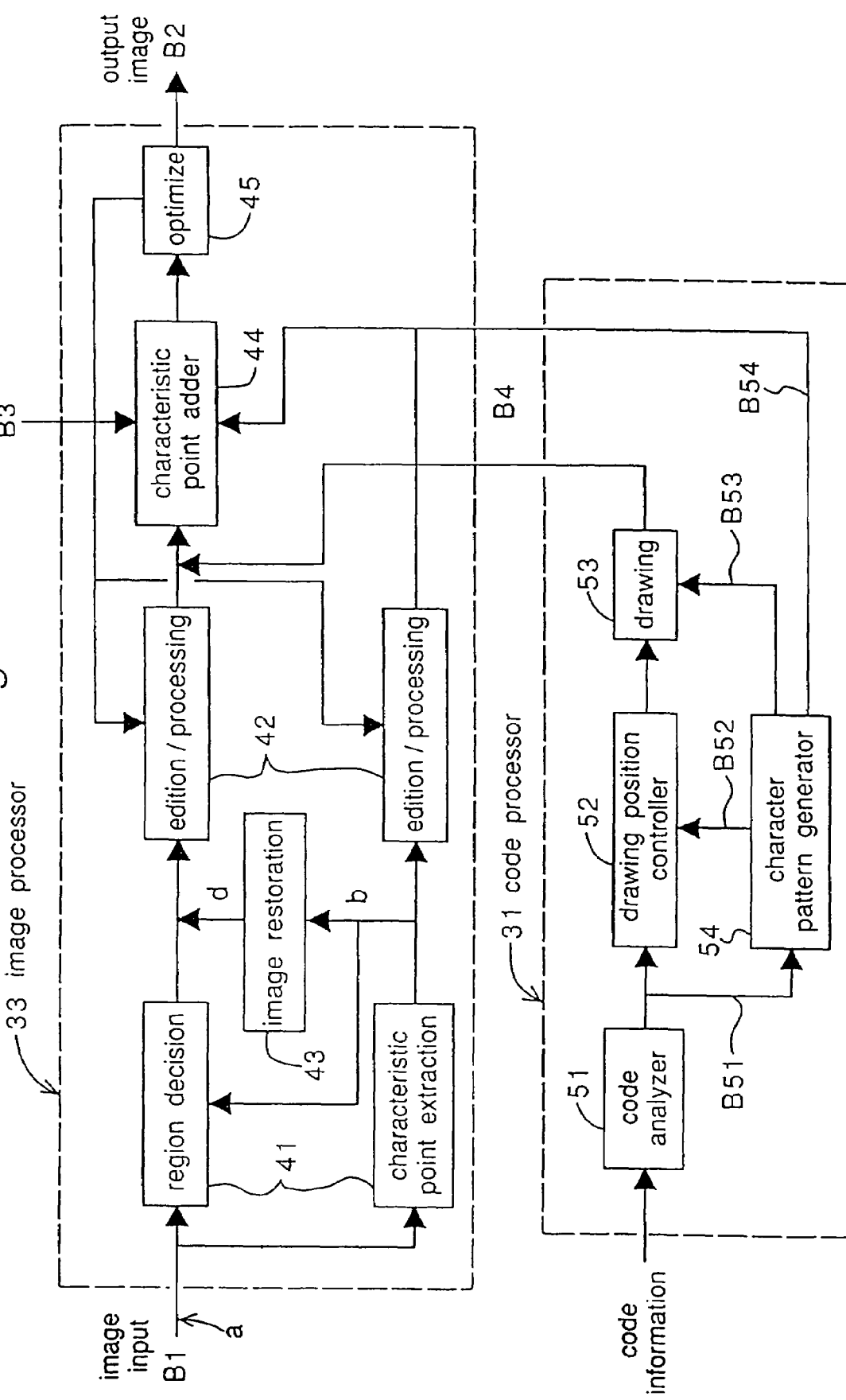
FIG. 38 is a block diagram of an image processor and a code processor.

FIG. 38 shows the structure of image processor 33 and the code processor 31. The image processor 33 includes an image analyzer 41 for region decision and characteristic point extraction, an editor 42, an image restoration section 43, a characteristic point adder 44 and an optimization section 45, as in the first embodiment.

In the code analyzer 51, the code information is divided into character codes for characters and format control codes for designating the print positions of the characters. In the drawing position controller 52, the drawing positions of characters are determined according to the format control data and the character size information obtained by the character pattern generator 54. In the character pattern generator 54 (refer to FIG. 39), patterns of characters designated by character codes by the code analyzer 51 are generated and characteristic points of the patterns are generated. In the drawing section 53, patterns obtained by the character pattern generator 54 are drawn at the print positions determined by the drawing position controller 52 in order to edit an image. Characteristic points obtained by the character pattern generator 54 are added to the edited image by the characteristic point adder 44, and the density or the like is corrected in the optimization section 45 to be sent as an output image.

Figure 39:
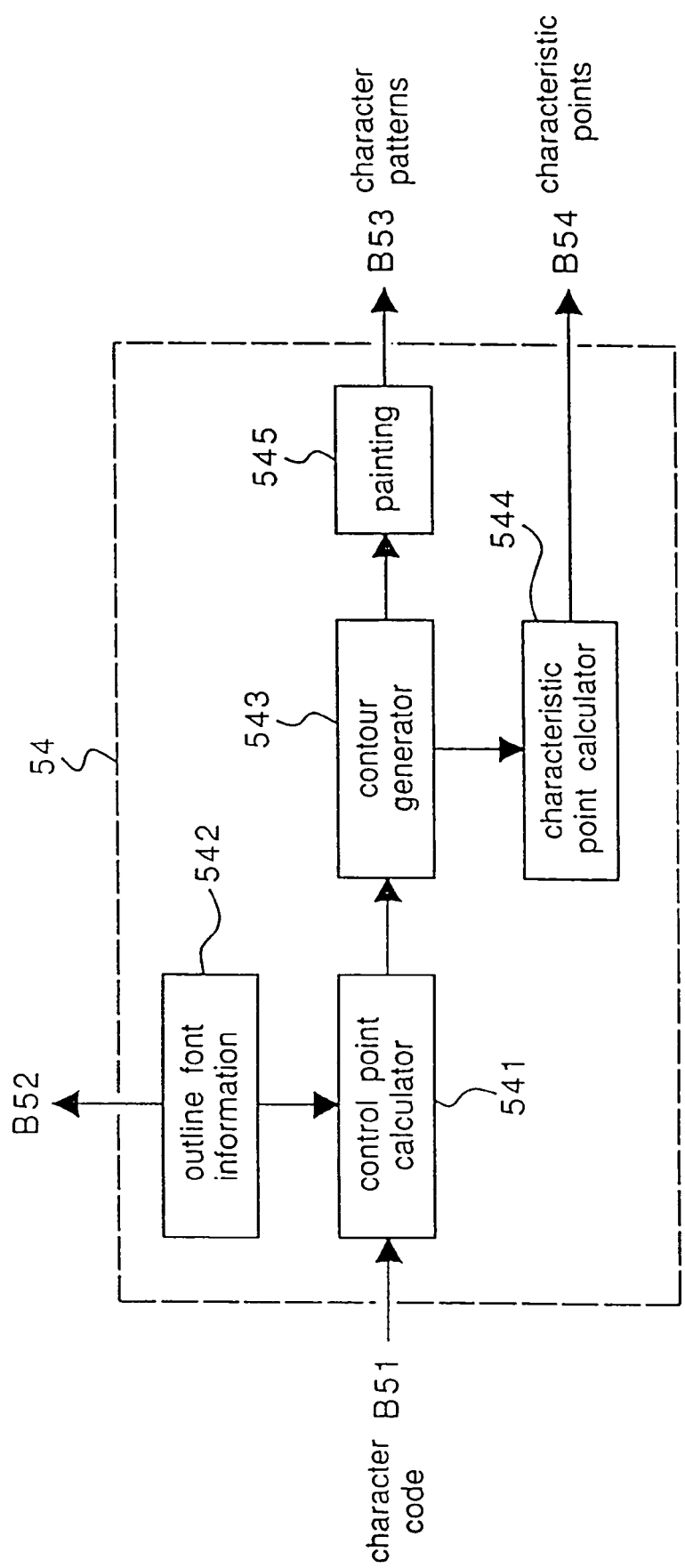
FIG. 39 is a block diagram of a character pattern generator for adding characteristic points to characters.

FIG. 39 shows a structure of the character pattern generator 54 for adding characteristic points to characters. The character pattern generator 54 uses an outline font which has coordinates (control points) necessary for generating contours of characters. A control point calculator 541 calculates control points from the outline font. An outline font information section 542 sends character size data to the drawing position controller 52. A contour generator 543 generates contours from control point coordinates, and a painting section 545 paints in the contours to get character patterns. A characteristic point calculator 544 calculates characteristic points from the control points and sends them to the characteristic point adder 44.

Figure 40:
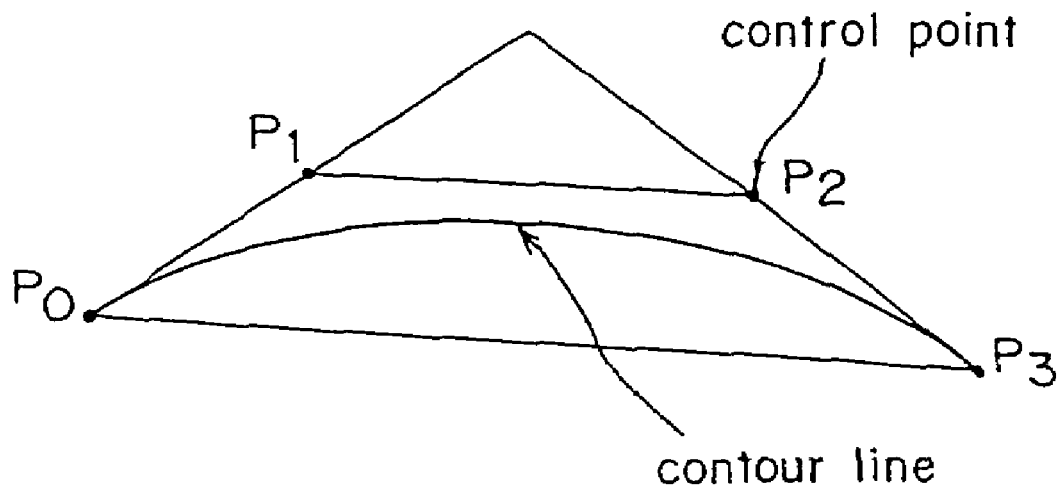
FIG. 40 is a diagram for illustrating control points expressing a contour of outline font.

FIG. 40 shows an example of control points for expressing a contour of outline font. This example uses a third Beziers curve having parameters of four points (P0-P3). The outline font data includes parameters (control points in this example) for a predetermined function (a third Beziers in this example) mainly.

The contour information of outline font may be located outside a font pattern, but characteristic points have to be located inside the pattern. A simple method is a linear approximation. This method needs many data for the control points of outline font, but it has no problem on characteristic points.

Figure 41:
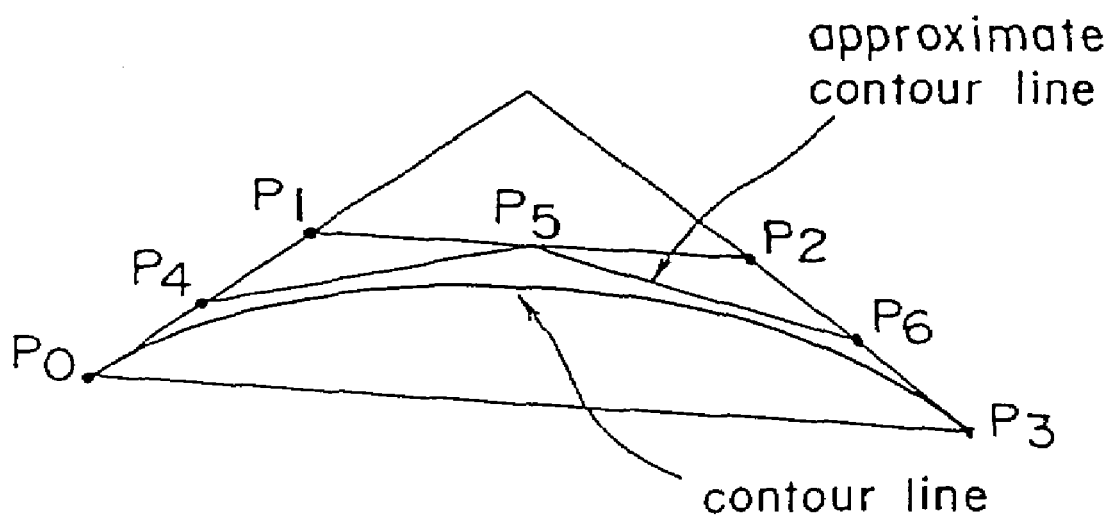
FIG. 41 is a diagram for illustrating the generation of characteristic points from control points.
Figure 42A:
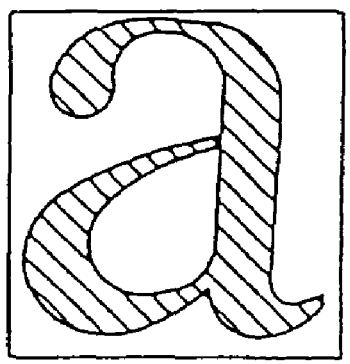
FIGS. 42(a), 42(b), 42(c) and 42(d) are diagrams for detection an error.
Figure 42B:
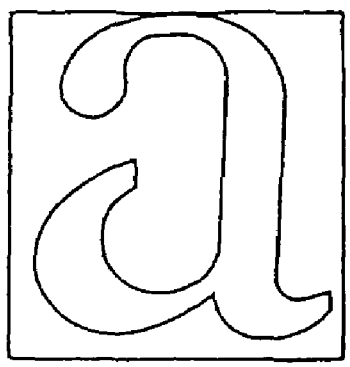
Figure 42C:
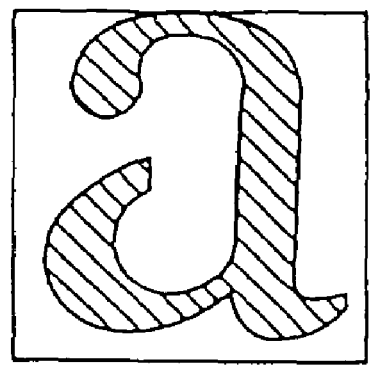
Figure 42D:

FIG. 41 shows an example of transformation from control points to characteristic points. The transformation is performed as in the calculation of a contour line from control points. First, a middle point P4 between control points P0 and P1, a middle point P5 between control points P1 and P2, and a middle point P6 between control points P2 and P3 are determined. Next, line sections connecting between P4 and P5 and between P5 and P6 are calculated. Thus, a line P0-P4-P5-P6-P3 is obtained as an approximation of a contour line. If the approximation is insufficient, middle points of these line sections are further combined for a new contour. The cross points of lines for approximation are used as characteristic points.

In cases of characters, calculations are performed from the outline font information. However, characteristic points can also be calculated easily when circular or linear patterns are printed.

F. Fifth Embodiment (k) Error Detection and Correction

Even if additive information for restoring an image such as characteristic points is added to an image, when patterns are patched partly or the additive information cannot be read correctly, the image quality may be degraded on the repetition of copy generation and may not be restored correctly.

FIG. 42 shows a case wherein errors happen on restoration. In this case, when characteristic points of input image shown in FIG. 42(a) are read erroneously, and a contour shown in FIG. 42(b) is obtained. Then a restored pattern shown in FIG. 42(c) is restored. This restored pattern is compared with the input image shown in FIG. 42(a), and if there is a difference larger than a predetermined amount as shown in FIG. 42(d), it is determined that an error happens in the reading of the input image. In FIG. 42(d), the hatched portion is the different part between the restored pattern of FIG. 42(c) and the input image of FIG. 42(a).

When such an error is found, new characteristic points are generated as explained above.

Figure 43:
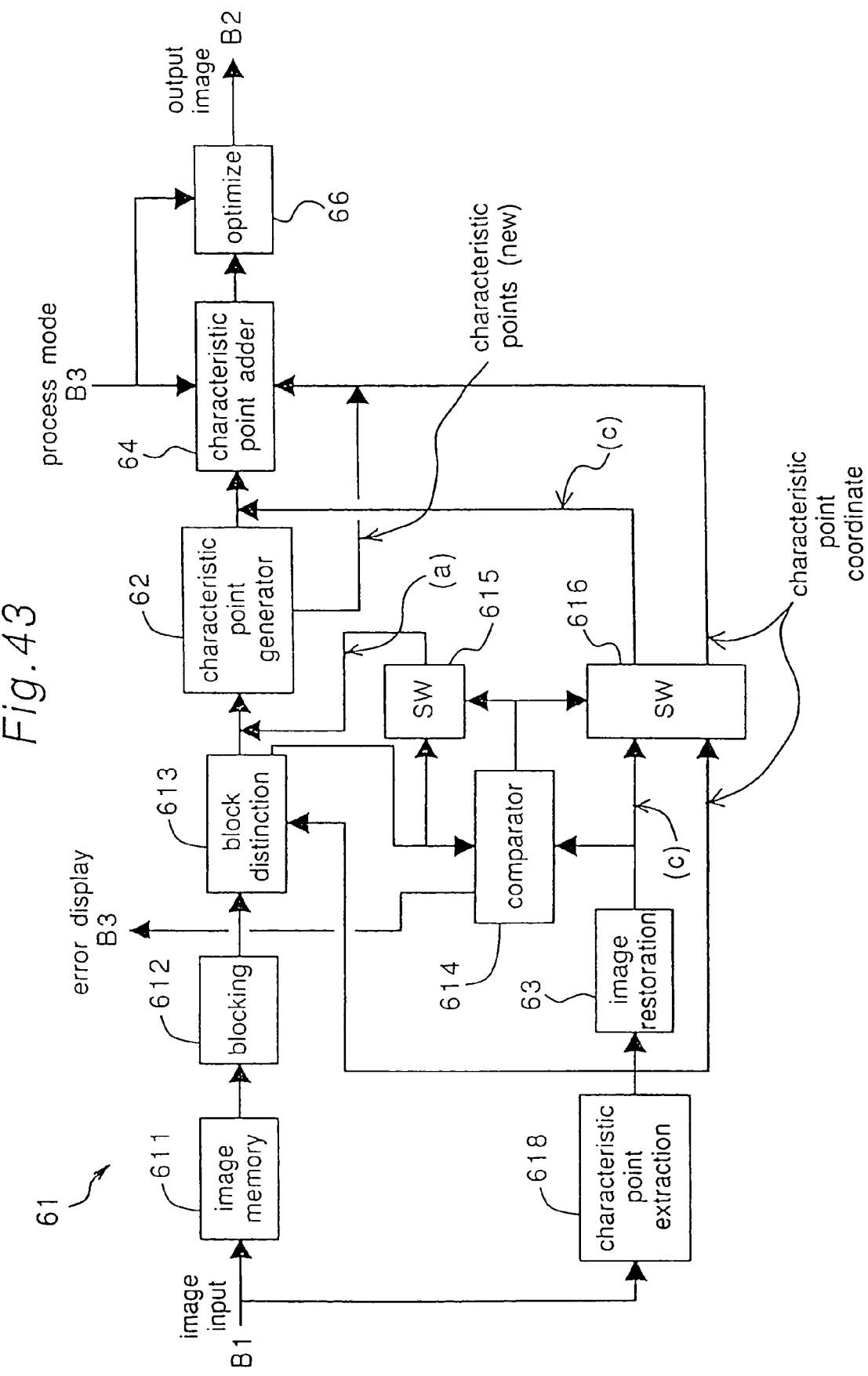
FIG. 43 is a block diagram of an image processor including a read error detection section and an error correction section.

FIG. 43 shows a structure of an image processor which equips a read error detection function and error correction function. As in the second embodiment, the image processor includes an image analyzer 61, a characteristic point generator 62, an image restoration section 63, a characteristic point adder 64 and an optimization section 66, but the structure of the image analyzer 61 is different. In the image analyzer 61, image data read from the image memory 611 is processed for blocking in a blocking section 612. Then, a block distinction section 613 takes out blocks also including characteristic points, and sends them to a comparator 614. On the other hand, characteristic points obtained by a characteristic point extraction section 618 are sent to the image restoration section 63 to obtain the restored image (FIG. 42(c)) which is also sent to the comparator section 614. The comparator section 614 compares the non-restored data (FIG. 42(a)) from the block distinction section 613 with the restored pattern restored on basis of the characteristic points. The comparator section 614 closes switches 615 and 616 when the error is small, to transmit the restored data and the original characteristic points to the characteristic point generator 62, wherein new characteristic points generated by the characteristic point generator 62 from the non-restored data are added. When an error happens, preferably the comparator section 63 sends a signal to the operational section 4 to display an error.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless, they depart therefrom.

The invention claimed is:

1. An image data processing apparatus comprising:
   an analyzer configured to analyze received code data and to generate image data based on said analyzed received code data, said received code data and said image data including sufficient information to define an image;
   a generator configured to generate additional data based on said analyzed received code data; and
   a synthesizer configured to synthesize said additional data with said image data and to output synthesized image data representing the image with the additional data encoded within the image,
   wherein said received code data is data representing contours of patterns.

2. An image data processing apparatus in accordance with claim 1,
   wherein said generator obtains coordinate information from the received code data and generates additional data based on said coordinate information.

3. An image data processing apparatus comprising:
   an analyzer configured to analyze received code data and to generate image data based on said analyzed received code data, said received code data and said image data including sufficient information to define an image;
   a generator configured to generate additional data based on said analyzed received code data, wherein said generator obtains coordinate information from the received code data and generates additional data based on said coordinate information; and
   a synthesizer configured to synthesize said additional data with said image data and to output synthesized image data representing the image with the additional data encoded within the image,
   wherein said received code data is outline font data representing contours of characters.

4. An image data processing method comprising the steps of:
   receiving code data, said received code data including sufficient information to define an image represented by image data;
   analyzing said received code data and generating said image data based on said analyzed received code data, said image data sufficient to define said image;
   generating additional data based on said analyzed received code data; and
   synthesizing said additional data with said image data and outputting synthesized image data representing the image with the additional data encoded within the image,
   wherein said received code data is data representing contours of patterns.

5. An image data processing method in accordance with claim 4,
   wherein said generating step includes: obtaining coordinate information from said received code data and generating additional data based on said coordinate information.

6. An image data processing method comprising the steps of:
   receiving code data, said received code data including sufficient information to define an image represented by image data;
   analyzing said received code data and generating said image data based on said analyzed received code data, said image data sufficient to define said image;
   generating additional data based on said analyzed received code data, wherein said generating step includes: obtaining coordinate information from said received code data and generating additional data based on said coordinate information; and
   synthesizing said additional data with said image data and outputting synthesized image data representing the image with the additional data encoded within the image,
   wherein said code data is outline font data representing character contours.

* * * * *